United States Patent
Clinton

[15] 3,676,426
[45] July 11, 1972

[54] 2-(1-HYDROXYALKYLIDENE)-3-OXO STEROIDS

[72] Inventor: Raymond O. Clinton, New York, N.Y.

[73] Assignee: Sterling Drug Inc., New York, N.Y.

[22] Filed: Nov. 22, 1968

[21] Appl. No.: 778,345

Related U.S. Application Data

[63] Continuation-in-part of Ser. No. 793,292, Feb. 16, 1959, which is a continuation-in-part of Ser. No. 723,148, March 24, 1958, abandoned.

[52] U.S. Cl. ..........260/239.55 R, 260/239.5, 260/239.55 C, 260/239.55 D, 260/397.4, 260/397.45, 260/397.47, 260/999
[51] Int. Cl. ..................................C07c 173/00, C07c 173/10
[58] Field of Search ................../Machine Searched Steroids

[56] References Cited

UNITED STATES PATENTS 2,882,282  4/1959  Agnello et al.......................260/397.3
3,214,447  10/1965  Ringold et al.:....................260/397.45

*Primary Examiner*—Henry A. French
*Attorney*—Elmer J. Lawson, B. Woodrow Wyatt, Thomas L. Johnson, Robert K. Bair, R. Clifford Bourgeois, William G. Webb and Roger T. Wolfe

[57] ABSTRACT

Steroido[3.2-c]pyrazoles, having endocrinological, including anabolic, activities, are prepared by interacting 2-(1-hydroxyalkylidene)-3-oxo steroids with hydrazine or a substituted hydrazine. The intermediate 2-(1-hydroxyalkylidene)-3-oxo steroids are in turn prepared by interacting a 3-oxo steroid with a lower-alkyl lower-alkanoate in the presence of a strong base.

18 Claims, No Drawings

2-(1-HYDROXYALKYLIDENE)-3-OXO STEROIDS

This application is a continuation-in-part of my copending application, Ser. No. 793,292, filed Feb. 16, 1959, which is in turn a continuation-in-part of my copending application, Ser. No. 723,148, filed Mar. 24, 1958, now abandoned.

This invention relates to intermediates in the preparation of steroido[3.2-c]pyrazoles, namely 2-(1-hydroxy-alkylidene)-3-oxo steroids.

It has been found that new and useful compounds are produced when a pyrazole ring is fused through its 3- and 4-positions to the 3- and 2-positions, respectively, of a steroid nucleus, said steroid having from 17 to about 23 carbon atoms exclusive of ester radicals.

The ring structure of the steroido[3.2-c]pyrazoles is represented by the following structure:

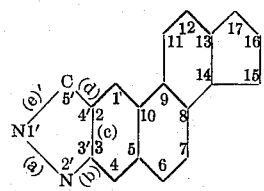

The exact nature of the steroid moiety is not critical. The utility of steroids, including those exhibiting hormonal or other pharmacological or endocrinological properties, is well-known. Such steroid moieties have from seventeen to about 23 carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid.

The steroid moiety can be any member of the estrane, 18-norestrane, androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, optionally together with a hydroxy group at $C_{17}$, characteristic of the progestational and adrenal cortical steroids. The steroid moiety can also have one or more substitutents at other positions of the nucleus, for example, hydroxy, acyloxy, or oxo radicals at positions 6, 7, 11, 12, 14 or 16; halogen atoms, preferably fluorine or chlorine, for example, at the 4-, 6-, 7-, 9-, 12- or 21-positions; and lower-alkyl groups, for example, at the 2-, 4-, 6-, 11- or 16-positions. The steroid moiety can also have one or more double bonds, especially at the 4,5- and/or 1,2- and/or 6,7-positions. The steroid moiety usually possesses angular methyl groups at $C_{10}$ and $C_{13}$, although 18- and 19-nor-steroids and 18,19-bisnor-steroids, lacking one or both of the angular methyl groups at $C_{13}$ and $C_{10}$, respectively, are also contemplated.

When acyloxy radicals are present in the steroid moiety, the acyl radicals are preferably derived from carboxylic acids having from one to about 10 carbon atoms, conventionally employed in the steroid art, and having a molecular weight less than about 250. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated.

The steroido[3.2-c]pyrazoles are prepared by reacting a 2-(1-hydroxyalkylidene)-3-oxo steroid with a hydrazine, in particular, hydrazine itself or a mono-substituted hydrazine according to the following equation:

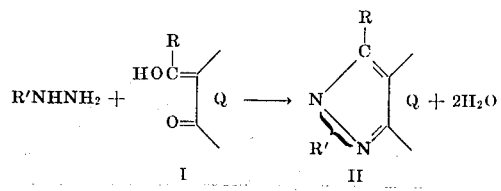

In the above general Formulas I and II, Q represents the remaining portion of the steroid moiety described above.

In the above Formulas I and II, R represents a hydrogen atom or a lower-alkyl radical, the latter having preferably from one to about four carbon atoms, thus including such groups as methyl, ethyl, propyl, isopropyl, butyl, and the like.

In the above Formula II, R' represents a hydrogen atom or a substituent inert under the conditions of the reaction between the hydrazine and 2-(1-hydroxyalkylidene)-steroid. A preferred group of substituents includes lower-alkyl radicals, e.g., methyl, ethyl, propyl, isopropyl, butyl, and the like; monocarbocyclic aryl radicals, e.g., phenyl, p-tolyl, and the like; lower-alkanoyl radicals, e.g., acetyl, propionyl, butyryl, and the like; monocarbocyclic aroyl radicals, e.g., benzoyl, p-nitrobenzoyl, p-toluyl, and the like; monocarbocyclic aryl-lower-alkanoyl radicals, e.g., phenylacetyl, β-phenylpropionyl, p-chlorophenylacetyl, and the like; monocarbocyclic aryloxy-lower-alkanoyl radicals, e.g., phenoxyacetyl, p-chlorophenoxyacetyl, p-methoxyphenoxyacetyl, and the like; and the carbamyl and guanyl radicals. When compounds where R' represents acyl, carbamyl or guanyl radicals, the starting mono-substituted hydrazines are mono-acyl hydrazines, semicarbazide or aminoguanidine, respectively. Alternatively, the compounds wherein R' represents hydrogen can be utilized as intermediates for preparing the compounds wherein R' represents an acyl radical or the carbamyl radical by reacting said compounds wherein R' represents hydrogen with the appropriate acid anhydride, or with cyanic acid (an alkali metal cyanate in the presence of mineral acid), respectively.

In the above Formula II, the radical R' is attached to one of the nitrogen atoms of the pyrazole ring, forming one of two possible isomeric structures (IIa and IIb):

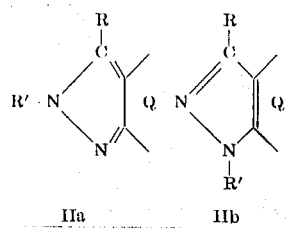

It is not known which of these two forms is produced in a given instance, and there is evidence that in some cases both isomers are obtained. This is due to the fact that the 2-hydroxyalkylidene-3-oxo steroid (I) in solution exists in tautomeric equilibrium, viz.:

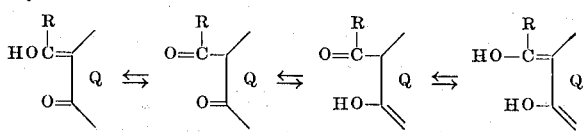

so that the substituted nitrogen portion of the hydrazine (R'NH—) can react with either the substituent in the 2-position or the substituent in the 3-position of the steroid nucleus.

It has, however, been established that the reaction of the 2-hydroxyalkylidene-3-oxo steroid with methylhydrazine (R' = $CH_3$) gives predominantly the 1'-methylpyrazole derivative (form IIa). This was proved by reacting a given 2-hydroxyalkylidene-3-oxo steroid with methylsemicarbazide, $H_2NN(CH_3)CONH_2$, followed by cyclization by pyrolysis of the resulting 3-oxo steroid substituted in the 2-position by the radical, $H_2NCON(CH_3)NHCH =$ , to give a pyrazole of type IIb where the methyl group is unequivocally in the 2'-position. The latter compound proved to be different from the compound produced by reacting the same 2-hydroxyalkylidene-3-oxo steroid with methylhydrazine.

The condensation of the hydrazine or substituted hydrazine with a 2-hydroxyalkylidene-3-oxo steroid is carried out by heating said steroid with at least one molar equivalent of the hydrazine in an inert solvent at a temperature between about 50° C. and 150° C. The inert solvent is preferably a lower-alkanol, e.g., ethanol.

If the steroid moiety has a double bond already present in the 1,2-position, the essential steroid intermediate is a 2-formyl-Δ¹-steroid (III; R is H) or a 2-lower-alkanoyl-Δ¹-steroid (III; R is lower-alkyl). If the hydrazine reactant is hydrazine itself (R' is H), the reaction is represented by the following equation:

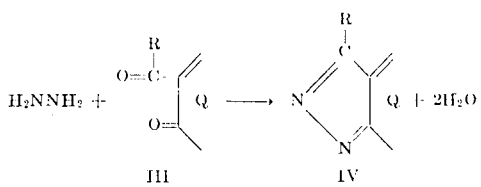

If the hydrazine reactant is a substituted hydrazine, the reaction is represented by the following equation:

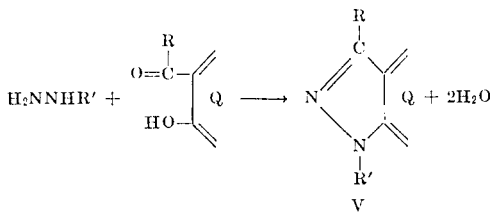

The intermediate 2-acyl-Δ¹-steroid (III) can be prepared by bromination or chlorination of a 2-acyl steroid (I) in the 2-position, followed by dehydrohalogenation with collidine or with lithium chloride in dimethylformamide solution.

Compounds having an aromatic ring A characteristic of the estrogens (estratriene compounds), viz.:

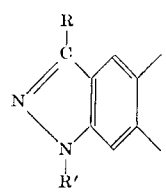

can be prepared by dehydrogenation of the corresponding Δ⁴-19-nor-steroido-pyrazole by conventional procedures, as by heating with palladium-on-carbon catalyst.

A particularly preferred group of steroido[3.2-c]-pyrazoles comprises those having the structural formula

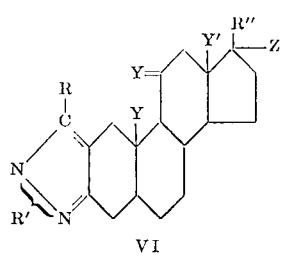

wherein R represents hydrogen or a lower-alkyl radical; R' represents hydrogen or a lower-alkyl, monocarbocyclic aryl, lower-alkanoyl, monocarbocyclic aryloxy-lower-alkanoyl, the carbamyl or the guanyl radical; R'' represents hydrogen or a lower-alkyl radical, a lower-alkenyl radical, a lower-alkynyl radical, the acetyl radical, a ketalized acetyl radical, the hydroxyacetyl radical, a ketalized hydroxyacetyl radical, the 1,2-dihydroxyethyl radical or the 1-hydroxyethyl radical; X is selected from the group consisting of $H_2$, (H)(OH) and O; Y and Y' represent hydrogen or the methyl radical; and Z represents hydrogen or the hydroxy radical, Z being restricted to hydroxy when R'' represents hydrogen, or a lower-alkyl, lower-alkenyl or lower-alkynyl radical. Also contemplated are carboxylic acid esters of the foregoing compounds, as well as those having one double bond in the 4,5-position (VII), or two double bonds, one in the 4,5-position and the other in the 6,7-position (VIII).

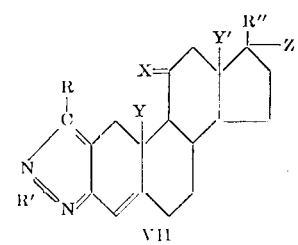

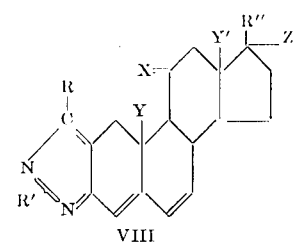

In the above general formulas VI, VII and VIII, R'', when it represents a lower-alkyl, lower-alkenyl, or lower-alkynyl radical, has from one to about four carbon atoms and may be straight or branched, and thus includes such groups as methyl, ethyl, propyl, isopropyl, butyl, isobutyl, tertiary-butyl, vinyl, 1-propenyl, 2-propenyl, ethynyl, propargyl, and the like.

The compounds of formulas VI, VII and VIII are prepared by reacting the appropriate 2-(1-hydroxyalkylidene)-3-oxo steroid, viz.:

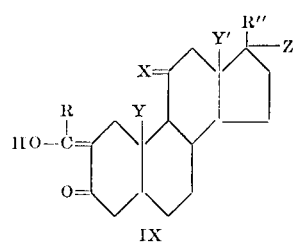

or the corresponding compounds where double bonds are present in the 4,5- or the 4,5- and 6,7-positions, with a hydrazine compound R'NHNH₂; R, R', R'', X, Z, Y and Y' having the same meanings given above, except that when the steroid moiety contains oxo groups in addition to the one at position 3, they are preferably protected as a ketal derivative to prevent side reactions with the hydrazine (hydrazone formation). For example, when compounds in which R'' represents acetyl or hydroxyacetyl are desired, these radicals are preferably ketalized by known methods, e.g., with ethylene glycol, prior to introduction of the hydroxy-alkylidene radical at the 2-position and reaction with a hydrazine. The 20-monoketals of 3,20-dioxo steroids are prepared from the 3,20-diketals by selective hydrolysis by known methods, e.g., by allowing the diketal to stand at room temperature in acetone solution containing a trace of p-toluenesulfonic acid. The ketal groups are readily cleaved by dilute acid either before or after the condensation with a hydrazine. It has been found, however, that 3,20-dioxo steroids bearing hydroxy groups at the 17- and 21-positions can be selectively formylated in the 2-position without protecting the 20-oxo group by ketalization, particularly if the 21-hydroxy group is etherified with a trityl or pyranyl radical. An oxo group at the 11-position is relatively unreactive and need not be protected before reaction with hydrazine or a derivative thereof.

As a variant on ketal formation, in the case where R'' is hydroxyacetyl and Z is OH, characteristic of cortisone and related cortical hormones, the side chain can be protected against formylation by first converting the compound to the 17,20; 20,21-bismethylenedioxy derivative by reacting it with formaldehyde in the presence of strong acid by known methods.

The intermediate 2-hydroxyalkylidene-3-oxo steroids (I) are prepared by condensing a 3-oxo steroid with a lower-alkyl lower-alkanoate, RCOOR''', wherein R is hydrogen or lower-alkyl and R''' is lower-alkyl in the presence of a strong base under anhydrous conditions. The strong base is preferably an alkali metal lower-alkoxide, amide or hydride. An acyl group enters the 2-position with elimination of a molecule of an alcohol as follows:

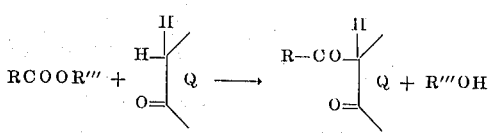

In the case wherein the radical R is lower-alkyl an alternative and preferred method comprises treating the 3-oxo steroid with a lower-alkanoic acid anhydride in the presence of boron trifluoride. Steroids containing a 17-hydroxy group, particularly the 17-hydroxy-17-alkyl steroids, can be protected against dehydration by prior esterification.

Steroido[3.2-c]pyrazoles saturated at the 5-position and belonging to the normal series (ring juncture A/B cis, etiocholane series) are also contemplated as well as those belonging to the allo series (ring juncture A/B trans, androstane series). Although, by analogy with halogenation procedures, it would be expected that ring A saturated compounds of the etiocholane series (ring juncture A/B cis) would form 4-hydroxyalkylidene derivatives rather than 2-hydroxyalkylidene derivatives, it has been found that the latter are produced preponderantly. This was proved by hydrogenating the double bond of a $\Delta^4$-steroido[3.2-c]pyrazole to produce a mixture of saturated steroido[3.2-c]pyrazoles of the androstane and etiocholane series, and showing that the etiocholane isomer was identical with that produced by direct formation of the pyrazole from the hydroxymethylene derivative of the parent etiocholane compound. If the hydroxymethylene group had entered the 4-position, the resulting pyrazole would have been fused to the 3,4-position of the steroid nucleus and would have been different from the etiocholano pyrazole obtained by hydrogenation of the $\Delta^4$ compound. Therefore, etiocholane as well as androstane compounds are useful as starting materials in the preparation of the compounds of the invention.

Endocrinological studies of the steroido[3.2-c]pyrazoles by standard test procedures have shown that they possess useful metabolic, hormonal or anti-hormonal properties. In particular, they have one or more of the following activities: anabolic, androgenic, pituitary inhibiting, estrogenic, progestational and adrenal cortical.

The steroido[3.2-c]pyrazoles, especially those having a saturated steroid nucleus and hydroxy and lower-alkyl radicals in the 17-position, further possess advantages in being anabolic (myotrophic and nitrogen retentive) at dose levels at which they do not show an appreciable degree of sex hormonal properties, as determined by standard procedures by oral or parenteral administration to male rats [Arnold et al. Proc. Soc. Exptl. Biol. Med. 102, 184 (1959); Hershberger et al., ibid. 83, 175 (1953)]. For example, 17β-hydroxy-17α-methylandrostano[3.2-c]-pyrazole was found to have an anabolic activity in rats about 35 times that of 17α-methyltestosterone upon oral administration while having an androgenic activity only about one-fourth that of 17α-methyltestosterone.

Anabolic agents are useful in the treatment of conditions arising from poor nitrogen utilization; various debilitating diseases; bone conditions such as fractures, osteoporosis, osteogenesis imperfecta; degenerative joint diseases; traumatic injuries which bring about losses of large amounts of nitrogen, such as severe burns; hypochromic anemias; and the like.

Generally speaking, the known anabolic agents possess a moderate to high degree of androgenic activity and their use leads to undesirable side-effects such as virilism and hirsutism. Therefore, the separation of these activities, as found in the compounds of the present invention, which have high anabolic but low androgenic activities, is a highly desirable feature.

Some of the steroido[3.2-c]pyrazoles, especially those having a double bond in the 4,5-position of the steroid nucleus and hydroxy and lower-alkyl radicals in the 17-position, in addition to myotrophic activity further possess useful pituitary inhibiting and estrogenic activity. For example, 17β-hydroxy-17α-methyl-4-androsteno[3.2-c]pyrazole was found to have a surprising degree of pituitary inhibiting activity not to be expected from its low androgenic activity and moderate estrogenic activity. Pituitary inhibiting agents are useful in the treatment of endocrinological disorders such as menopausal syndrome, endometriosis, postpartum breast engorgement, benign prostatic hypertrophy, functional uterine bleeding, chronic cystic mastitis, and suppression or termination of reproduction processes.

The actual quantitative determination of the effectiveness of a particular compound as an anabolic, pituitary inhibiting, estrogenic, progestational or cortical hormone agent is readily obtained by standard test procedures by technicians trained in pharmacological test procedures without the need for any extensive experimentation.

The steroido[3.2-c]pyrazoles can be prepared for use by dispersing them in an aqueous suspension or by dissolving them in a pharmacologically acceptable oil or oil-water emulsion for parenteral administration; or by incorporation in tablet form with excipients for oral administration.

An especial advantage of the steroido[3.2-c]pyrazoles lies in the fact that they are particularly effective upon oral administration.

The invention here relates to the novel intermediate 2-(1-hydroxyalkylidene)-3-oxo steroids illustrated and set forth in the examples below. Certain of these compounds fall into discrete structural classes as follows:

a. Compounds of the formula

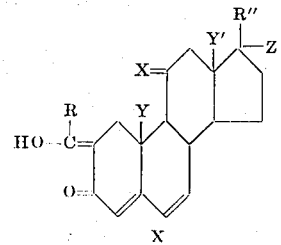

wherein R represents a member of the group consisting of hydrogen and lower-alkyl radicals; R'' represents a member of the group consisting of lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethyl radical; X represents a member of the group consisting of $H_2$, (H) (OH) and O; Y and Y' represent a member of the group consisting of hydrogen and the methyl radical; and Z represents a member of the group consisting of hydrogen and the hydroxy radical, Z being restricted to hydroxy when R'' represents a member of the group consisting of lower-alkyl, lower-alkenyl and lower-alkynyl radicals; and including carboxylic acid esters thereof derived from carboxylic acids having from one to about ten carbon atoms and having a molecular weight less than about 200. The lower-alkyl, lower-alkenyl and lower-alkynyl groups can have up to four carbon atoms as defined hereinabove.

b. Compounds of the formula

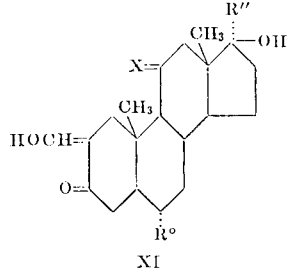

XI wherein R″ is lower-alkenyl or lower-alkynyl, R° is hydrogen or lower-alkyl and X is H₂, (H) (OH) or O; or compounds of the above formula having a double bond in the 4,5-position. The lower-alkyl, lower-alkenyl and lower-alkynyl groups can have up to four carbon atoms as defined hereinabove.

c. Compounds of the formula

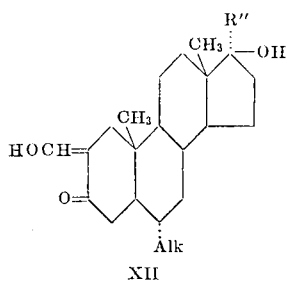

XII wherein R″ and Alk are lower-alkyl; or compounds of the above formula having a double bond in the 4,5-position. The lower-alkyl groups can have from one to four carbon atoms.

d. Compounds of the formula

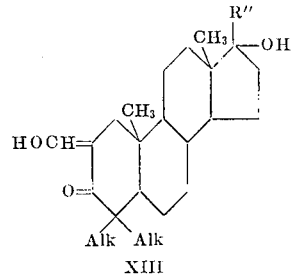

XIII wherein R″ is hydrogen or lower-alkyl, and the Alk groups are lower-alkyl groups which can be combined to form a spirocycloalkane group of 5–6 ring members; or compounds of the above formula having a double bond in the 5,6-position. The lower-alkyl groups can have from one to four carbon atoms.

e. Compounds of the formula

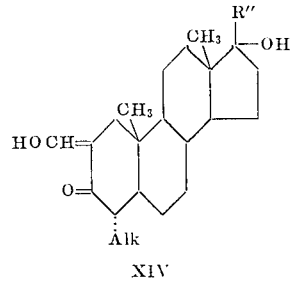

XIV wherein R″ and Alk are lower-alkyl; or compounds of the above formula having a double bond in the 4,5-position. The lower-alkyl groups can have from one to four carbon atoms.

f. Compounds of the formula

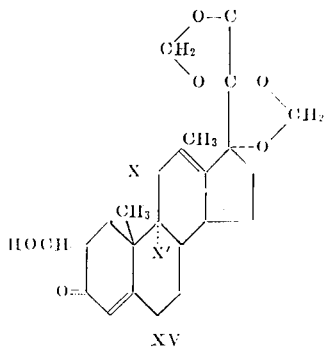

XV wherein X is (H) (OH) or O, and X′ is hydrogen or fluorine.

g. Compounds of the formula

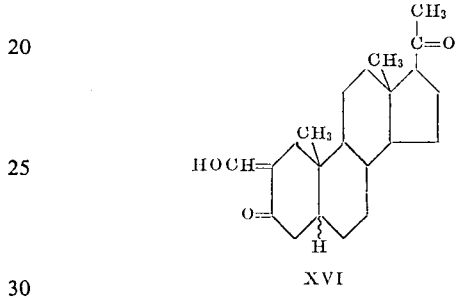

XVI or 20ethylene glycol ketals thereof.

The 2-(1-hydroxyalkylidene)-3-oxo steroids of the invention are also useful as intermediates, by reaction with hydroxylamine, to produce steroido[2,3-d]isoxazoles, having useful endocrinological properties (U.S. Pat. No. 3,135,743).

Besides being useful as intermediates, the novel 2-(1-hydroxyalkylidene)-3-oxo steroids of the invention have also been shown to possess endocrinological activity. In particular they have pituitary inhibiting properties as measured by the manifest endocrine imbalance brought about by decrease in the pituitary secretion of the follicle-stimulating and interstitial cell-stimulating hormones. The pituitary inhibiting properties were determined by standard test procedures involving a measure of the modification of estrogen-induced endocrinopathies upon parenteral administration in male rats [Beyler et al., *Endocrinology*, 58, 471–6 (1956)].

A compound of particular interest is 2-hydroxy-methylene-17α-methylandrostan-17β-ol-3-one which also has anabolic (myotrophic) activity, as determined by standard test procedures by oral or parenteral administration to male rats [Arnold et al., loc. cit.; and Hershberger et al., loc. cit.].

The actual quantitive determination of the effectiveness of a particular 2-hydroxyalkylidene-3-oxo steroid of the invention as a pituitary inhibiting or anabolic agent is readily obtained by standard test procedures by technicians trained in pharmacological test procedures without the need for any extensive experimentation. The compounds are prepared for use by standard formulation procedures by dispersing them in a pharmacologically acceptable oil or oil-water emulsion for parenteral administration; or by incorporation in tablet form with excipients for oral administration.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1 a. 2-Hydroxymethylene-17α-methylandrostan-17β-ol-3-one.

A solution of 20.7 g. of 17α-methylandrostan-17β-ol-3-one in 500 ml. of benzene was added to sodium methoxide (prepared by dissolving 15.0 g. of sodium in 250 ml. of absolute methanol, concentrating the solution and drying the residue for 1 hour at 150°–160° C. and 15 mm.). Ethyl formate (48.8 g.) was then added with stirring in a nitrogen atmosphere. The reaction mixture was stirred for 4 hours longer at room temperature, allowed to stand for about 15 hours, stirred for 2 hours longer and the poured into water. The benzene layer was separated and the aqueous layer extracted with benzene. Nitrogen was bubbled through the aqueous layer to remove benzene, and the mixture was filtered. Concentrated hydrochloric acid and ice were added to the filtrate until the mixture was acid to Congo Red, and the product was extracted with chloroform. The chloroform extracts were washed with water, dried over anhydrous sodium sulfate, filtered and concentrated in vacuo to a volume of 80 ml., whereupon there separated 14.89 g. of 2-hydroxymethylene-17α-methylandrostan-17β-ol-3-one, m.p. 179°–183° C. (uncorr.). A sample when recrystallized from an ether-methanol mixture and dried at 80° C. in vacuo had the m.p. 185°–190.5° C. (corr.), $[\beta]_D^{25} = +22.3°$ (1 percent in chloroform); ultraviolet maximum at 282 m$\mu$ (E = 10,300).

Anal. Calcd. for $C_{21}H_{32}O_3$: C, 75.86; H, 9.70.

Found: C, 76,10; H, 9.53.

2-Hydroxymethylene-17β-methylandrostan-17β-ol-3-one, when heated with a molar equivalent amount of diethylamine, gave the diethylamine salt in the form of colorless plates, m.p. 114.6°–116.4° C. (dec.) (corr.), $[\alpha]_D^{25} = +16.6°$ (1 percent in chloroform).

Anal. Calcd. for $C_{21}H_{32}O_3 \cdot (C_2H_5)NH$: C, 74.03; H, 10.69; N, 3.45.

Found: C, 74.24; H, 10.93; N, 3.20.

2-Hydroxymethylene-17α-methylandrostan-17β-ol-3-one was found to possess significant pituitary inhibitory activity as measured by the enhancement of estrogen induced testicular atrophy in rats at dose levels of 10–20 mg./kg./day.

b. 17α-methylandrostano[3.2-c]pyrazole

VI; R and R' are H, R'' is $CH_3$, X is $H_2$, Z is OH, Y and Y' are $CH_3$].

To a warmed solution of 500 mg. of 2-hydroxymethylene-17α-methylandrostan-17β-ol-3-one in 40 ml. of 95 percent ethanol was added 160 mg. of hydrazine hydrate. The reaction mixture was refluxed for three hours, concentrated to a volume of 20 ml., cooled, and the product which separated was collected and washed with ether, giving 440 mg., m.p. 144° C. (uncorr.).

The reaction was repeated starting with 3.50 g. of 2-hydroxymethylene-17α-methylandrostan-17β-ol-3-one and 1.12 g. of hydrazine hydrate in 200 ml. of ethanol, giving 3.33 g. of crude product. The combined products were recrystallized from 400 ml. of acetone to give 3.26 g. of product, m.p. 146°–148° C. (uncorr.). All of the crude material was combined, dissolved in 200 ml. of 95 percent ethanol, 2 ml. of hydrazine hydrate was added and the mixture refluxed for 4 hours. The reaction mixture was concentrated to dryness and the residue recrystallized twice from ethanol and dried at 150° C. for 8 hours in vacuo, giving 17α-hydroxy-17α-methylandrostano[3.2-c]pyrazole, m.p. 230°–242° C. (corr.), $[\beta]_D^{25} = +35.7 \pm 0.2°$ (1 percent in chloroform); ultraviolet maximum at 223 m$\mu$ (E = 4,740).

Anal. Calcd. for $C_{21}H_{32}N_2O$: C, 76.78; H, 9.82; N, 8.53.

Found: C, 76.65; H, 9.73; N, 8.45.

EXAMPLE 2

17β-Hydroxy-17α-methylandrostano[3.2-c]pyrazole

[VI; R and R' are H, R'' is $CH_3$, X is $H_2$, Z is OH, Y and Y' are $CH_3$].

17α-Methylandrostan-17β-ol-3-one (49.54 g.) was dissolved in 1,600 ml. of benzene, 400 ml. of the benzene was distilled off and the solution cooled to room temperature. There was then added 25.0 g. of sodium hydride and 60 ml. of ethyl formate (previously dried and distilled over phosphorus pentoxide), while maintaining the reaction mixture under a nitrogen atmosphere. Methanol (40 ml.) was then slowly added while the mixture was cooled in an ice bath. The reaction mixture was allowed to come to room temperature and stirred for 18 hours in a nitrogen atmosphere. Methanol (5 ml.) was then added, and the mixture stirred for 10 minutes and cooled in an ice bath. Water was added, the suspended solid material was collected by filtration, washed with ethyl acetate and mixed with the aqueous portion of the filtrate, and the latter was treated with concentrated hydrochloric acid and ice until the mixture was acidified. The resulting solid product was collected by filtration, washed with water and dried in vacuo first over solid potassium hydroxide and then over calcium chloride at 50° C. for three days, giving 51.6 g. of 2-hydroxymethylene-17α-methyl-androstan-17β-ol-3-one, m.p. 158°–179° C. (uncorr.). The latter material was dissolved in 600 ml. of 95 percent methanol, the solution filtered, and 8.4 ml. of hydrazine hydrate was added to the filtrate. The latter mixture was refluxed for 10 minutes, concentrated to a volume of 250 ml. and cooled, whereupon there separated 47.0 g. of 17β-hydroxy-17α-methylandrostano[3.2-c]-pyrazole, m.p. 213°–228° C. (uncorr.). Upon concentration of the mother liquors a second crop of 3.69 g. was obtained. The combined product had the m.p. 225°–241° C. (uncorr.) when recrystallized from ethanol and dried over phosphorus pentoxide for 31 hours at 100°–130° C.

A solution of 17β-hydroxy-17α-methylandrostano[3.2-c]-pyrazole in 350 ml. of methanol was treated with 35 ml. of 1.11M ethereal hydrogen chloride. Upon concentration of the solution there was obtained the hydrochloride salt of 17β-hydroxy-17α-methylandrostano[3.2-c]pyrazole in solvated form, m.p. 234°–254° C. (uncorr.).

When measured by nitrogen retention studies in the rat, 17β-hydroxy-17α-methylandrostano[3.2-c]pyrazole was found to have an anabolic activity about 35 times that of 17α-methyl-testosterone upon oral administration while having an androgenic activity only about one-fourth that of 17α-methyl-testosterone.

EXAMPLE 3 a. 2-Hydroxymethylene-17α-vinyl-4-androsten-17β-ol-3-one.

A mixture of 12.04 g. of 17α-vinyl-4-androsten-17β-ol-3-one, 12 ml. of ethyl formate and 4.0 g. of sodium hydride in 300 ml. of benzene was kept at room temperature for 3 days under a nitrogen atmosphere. After this time about 2 g. of sodium methoxide was added and the reaction mixture allowed to stand for 7 days longer. The reaction mixture was worked up according to the manipulative procedure described above in Example 2, giving 11.46 g. of 2-hydroxymethylene-17α-vinyl-4-androsten-17β-ol-3-one in semi-crystalline form.

b. 17β-Hydroxy-17α-vinyl-4-androsten[3.2-c]pyrazole

[VII; R and R' are H, R'' is $CH=CH_2$, X is $H_2$, Z is OH, Y and Y' are $CH_3$] was prepared from 3.4 g. of 2-hydroxymethylene-17α-vinyl-4-androsten-17β-ol-3-one and 1.6 g. of hydrazine hydrate in ethanol solution. There was thus obtained 3.11 g. of 17β-hydroxy-17α-vinyl-4-androsten[3.2-c]pyrazole, m.p. 235°–259° C. (uncorr.), which was further purified by several recrystallizations from ethanol and drying over phosphorus pentoxide as 150° C. in vacuo to give a sample having the m.p. 247°–259.5° C. (corr.), $[\beta]_D^{25} = +101.2 \pm 0.2°$ (1 percent in chloroform); ultraviolet maximum at 260 m$\mu$(E = 10,600).

Anal. Calcd. for $C_{22}H_{30}N_2O$: C, 78.06; H, 8.93; N, 8.28.

Found: C, 78.30; H, 9.19; N, 8.36.

EXAMPLE 4 a. 17α-Ethynyl-2-hydroxymethylene-4-androsten-17β-ol-3-one.

To a solution of 14.2 g. of 17α-ethynyl-4-androsten-17β-ol-3-one in 300 ml. of dry pyridine was added 23 ml. of dry ethyl formate and then a solution of sodium ethoxide in ethanol (from 2.1 g. of sodium and 35 ml. of absolute ethanol). The reaction mixture was allowed to stand at room temperature for 42 hours and then poured onto ice-water. Glacial acetic acid (218 ml.) was added and the gummy product was separated and dissolved in ether. The ether solution was washed with a solution of 30 g. of potassium hydroxide in 1.5 liters of water, and the aqueous layer was cooled at 5° C. and acidified with 6N hydrochloric acid. The precipitated product was collected by filtration and dried in vacuo over phosphorus pentoxide at 60° C., giving 13.5 g. of 17α-ethynyl-2-hydroxymethylene-4-androsten-17β-ol-3-one.

b. 17α-Ethynyl-17β-hydroxy-4-androsteno[3.2-c]pyrazole [VII; R and R' are H, R'' is C ≡ CH, X is $H_2$, Z is OH, Y and Y' are $CH_3$] was prepared from 5.0 g. of 17α-ethynyl-2-hydroxymethylene-4-androsten-17β-ol-3-one and 0.77 g. of hydrazine hydrate. The resulting product was recrystallized from methanol and from aqueous acetone and dried in vacuo at 115° C. for 24 hours, giving 17α-ethynyl-17β-hydroxy-4-androsteno[3.2-c]pyrazole, m.p. 239.6°–246.6° C. (corr.); $[\alpha]_D^{25}$ = +29.0 ± 0.1° (1 percent in chloroform); ultraviolet maximum at 261 m$\mu$ (E = 10,700). It had infrared bands at 3.10 $\mu$ and 4.77 $\mu$, characteristic of an acetylene linkage.

Anal. Calcd. for $C_{22}H_{28}ON_2$: C, 78.53; H, 8.39.
Found: C, 78.51; H, 8.35.

EXAMPLE 5 a. 2-Hydroxymethylene-4-pregnen-20β-ol-3-one was prepared from 13.15 g. of 4-pregnen-20β-ol-3-one, 15 ml. of ethyl formate and 3.0 g. of sodium hydride in 300 ml. of benzene according to the manipulative procedure described above in Example 2.

20β-Hydroxy-4-pregneno[3.2-c]pyrazole [VII; R and R' are H, R'' is $CH(OH)CH_3$, X is $H_2$, Z is H, Y and Y' are $CH_3$].

The total acidic fraction of the product obtained above in part (a), comprising 2-hydroxymethylene-4-pregnen-20β-ol-3-one, in 150 ml. of ethanol was treated with 10 ml. of hydrazine hydrate, and the mixture was refluxed for 1 hour and allowed to stand at room temperature for about 3 days. The product was isolated and recrystallized several times from methanol giving 20β-hydroxy-4-pregneno[3.2-c]pyrazole, m.p. 262.5°–269° C. (corr.), $[\alpha]_D^{25}$ = +114.9 ± 0.1° (1 percent in chloroform); ultraviolet maximum at 260 m$\mu$ (E = 11,000).

Anal. Calcd. for $C_{22}H_{32}N_2O$: C, 77.60; H, 9.47; O, 4.70.
Found: C, 77.49; H, 9.43; O, 4.60.

EXAMPLE 6 a. 2-Hydroxymethylene-17α-methyl-4,6-androstadien-17β-ol-3-one was prepared from 11.4 g. of 17α-methyl-4,6-androstadien-17β-ol-3-one, 12.0 ml. of ethyl formate and 3.7 g. of sodium hydride in 250 ml. of benzene according to the manipulative procedure described above in Example 2. There was thus obtained 5.3 g. of 2-hydroxymethylene-17α-methyl-4,6-androstadien-17β-ol-3-one, m.p. 117°–123° C. (uncorr.).

b. 17β-Hydroxy-17α-methyl-4,6-androstadieno[3.2-c]pyrazole [VII; R and R' are H, R'' is $CH_3$, X is $H_2$, Z is OH, Y and Y' are $CH_3$] was prepared from 6.0 g. of 2-hydroxymethylene-17α-methyl-4,6-androstadien-17β-ol-3-one and 1.9 g. of hydrazine hydrate in 200 ml. of ethanol. There was thus obtained 4.6 g. of 17β-hydroxy-17α-methyl-4,6-androstadieno[3.2-c]pyrazole, m.p. 278°–282° C. (uncorr.), which was further purified by recrystallization from ethyl acetate to give a sample having the m.p. 279°–284° C. (corr.), $[\alpha]_D^{25}$ = −126.1 ±0.1° (1 percent in pyridine); ultraviolet maxima at 226, 232, 297 and 308 m$\mu$ (E = 9,194, 8,244, 24,329 and 18,355, respectively).

Anal. Calcd. for $C_{21}H_{28}N_2O$: C, 77.73; H, 8.70; N, 8.64.
Found: C, 77.92; H, 8.53; N, 8.35.

EXAMPLE 7 a. 2-Hydroxymethylene-4,6-androstadien-17β-ol-3-one was prepared from 12.41 g. of 4,6-androstadien-17β-ol-3-one, 14 ml. of ethyl formate and 3.9 g. of sodium hydride according to the manipulative procedure described above in Example 2. There was thus obtained 13.15 g. of 2-hydroxymethylene-4,6-androstadien-17β-ol-3-one, m.p. 80°–100b$L$ C. (uncorr.).

b. 17β-Hydroxy-4,6-androstadieno[3.2-c]pyrazole [VIII; R, R' and R'' and H, X is $H_2$, Z is OH, Y and Y' are $CH_3$] was prepared from 3.14 g. of 2-hydroxymethylene-4,6-androstadien-17β-ol-3-one and 1.45 ml. of hydrazine hydrate in 50 ml. of ethanol. There was thus obtained 2.67 g. of 17β-hydroxy-4,6-androstadieno[3.2-c]-pyrazole, m.p. 264°–268° C. (uncorr.). The latter was recrystallized from ethanol and from ethyl acetate and dried in vacuo at 70° C. for 24 hours to give a sample in the form of pale yellowish crystals, m.p. 272.8°–277.0° C. (corr.), $[\alpha]_D^{25}$ = −137.2 ± 0.1° (1 percent in ethanol); ultraviolet maxima at 220, 225, 232, 296 and 300 m$\mu$ (E = 7,600, 8,500, 7,800, 22,000 and 16,600, respectively).

Anal. Calcd. for $C_{20}H_{26}N_2O$: C, 77.38; H, 8.44; N, 9.03.
Found: C, 77.40; H, 8.42; N, 9.29.

EXAMPLE 8 a. 2-Hydroxymethylene-4,4,17α-trimethyl-5-androsten-17α-ol-3-one was prepared from 6.2 g. of 4,4,17α-trimethyl-5-androsten-17β-ol-3-one, 16 ml. of ethyl formate and sodium methoxide (from 2.2 g. of sodium and 40 ml. of methanol) in 400 ml. of benzene according to the manipulative procedure described above in Example 1, part (a). There was thus obtained 5.54 g. of 2-hydroxymethylene-4,4,17α-trimethyl-5-androsten-17β-ol-3-one.

b. 17β-Hydroxy-4,4,17α-trimethyl-5-androsteno[3.2-c]pyrazole was prepared from 1.61 g. of 2-hydroxymethylene-4,4,17α-trimethyl-5-androsten-17β-ol-3-one and 0.30 g. of hydrazine hydrate. The product was recrystallized from methanol and dried at 115° C. in vacuo for 24 hours to give 0.81 g. of 17β-hydroxy-4,4,17α-trimethyl-5-androsteno[3.2-c]pyrazole, m.p. 270.4°–276.0° C. (corr.), $[\alpha]_D^{25}$ = −55.0 ± 0.2° (1 percent in 95 percent ethanol); ultraviolet maximum at 223 m$\mu$ (E = 5,300).

Anal. Calcd. for $C_{23}H_{34}N_2O$: C, 77.92; H, 9.67; N, 7.90.
Found: C, 78.23; H, 9.47; N, 7.65.

EXAMPLE 9 a. 2-Acetyl-17β-acetoxyandrostan-3-one.

A mixture of 9.6 g. (0.16 mole) of glacial acetic acid and 50 ml. of ethylene dichloride was cooled in an ice-bath, and dry boron trifluoride gas was passed into the solution until it was saturated. With continued addition of boron trifluoride, a solution of 11.60 g. (0.04 mole) of androstan-17β-ol-3-one and 12.2 g. (11.4 ml., 0.12 mole) of acetic anhydride in 75 ml. of ethylene dichloride was added. The reaction mixture was stirred in the ice-bath for thirty minutes and at room temperature for three hours, and then poured into a solution of 30 g. of sodium acetate trihydrate in 200 ml. of water. The organic solvent was distilled off, and the residue refluxed for forty-five minutes and diluted with water. The solid product was collected by filtration, suspended in 200 ml. of methanol containing 23 ml. of 35 percent sodium hydroxide solution with stirring, 25 ml. of water was added, and the solution allowed to stand for one hour. The solution was acidified with glacial acetic acid, the methanol removed in vacuo, and water was added to precipitate a gummy product. The latter was separated, dried and dissolved in 25 ml. of acetic anhydride and 20 ml. of pyridine. The solution was kept at room temperature overnight and then heated for one hour on a steam bath. The reaction mixture was added to cold, dilute sulfuric acid and the product collected, washed, dissolved in hot methanol, and the solution filtered. Water was added to the filtrate to the point of turbidity, and the product which separated upon cooling was collected and dried at 70° C.; yield 11.59 g., m.p. 132°–158° C. (uncorr.). The latter was dissolved in n-hexane and chromatographed on alumina. The fraction eluted with 20 percent ether in n-pentane was recrystallized from acetone and dried in vacuo at 110° C. for 8 hours, giving 6.98 g. of 2-acetyl-17β-acetoxyandrostan-3-one, m.p. 183.0-184.6° C. (corr.), $[\alpha]_D^{25} = +39.4 \pm 0.2°$ (1 percent in chloroform); ultraviolet maximum at 290 mμ (E = 9,100).

Anal. Calcd. for $C_{23}H_{34}O_4$: C, 73.76; H, 9.15.
Found: C, 73.80; H, 9.55.

There was isolated from the foregoing reaction mixture as a byproduct, 2-acetyl-3,17β-diacetoxy-2-androstene, the enol acetate of 2-acetyl-17β-acetoxyandrostan-3-one, obtained in the form of colorless needles, m.p. 169.6°-177.4° C. (corr.), $[\alpha]_D^{25} = +59.2 \pm 0.2°$ (1 percent in chloroform); ultraviolet maximum at 240 mμ (E= 8,850).

Anal. Calcd. for $C_{25}H_{36}O_5$: C, 72.08; H, 8.71.
Found: C, 72.15; H, 8.63.

b. 17β-Acetoxyandrostano[3.2-c]-5'-methylpyrazole [VI; R is $CH_3$, R' is H, R" is H, X is $H_2$, Z is $OCOCH_3$, Y and Y' are $CH_3$] was prepared from 3.00 g. of 2-acetyl-17β-acetoxyandrostan-3-one and 0.45 g. of hydrazine hydrate in 50 ml. of ethanol. The resulting product was recrystallized from ethyl acetate and from aqueous ethanol and dried in vacuo for 8 hours at 120°-125° C., giving 17β-acetoxyandrostano[3.2-c]-5'-methylpyrazole, m.p. 254.0°-262.8° C. (corr.), $[\alpha]_D^{25} = +41.7°$ (1 percent in chloroform); ultraviolet maximum at 224 mμ (E = 5,300).

Anal. Calcd. for $C_{23}H_{34}N_2O_2$: C, 74.55; H, 9.25; O, 8.64.
Found: C, 74.25; H, 9.06; O, 8.90.

17β-Acetoxyandrostano[3.2-c]-5'-methylpyrazole was saponified to give 17β-hydroxyandrostano[3.2-c]-5'-methylpyrazole, m.p. 236.4°-240.6° C. (corr.), $[\alpha]_D^{25} = +60.1°$ (1 percent in chloroform); ultraviolet maximum at 225 mμ (E = 5,400).

Anal. Calcd. for $C_{21}H_{32}N_2O$: C, 76.78; H, 9.82; N, 8.5.
Found: C, 76.84; H, 9.52; N, 8.4.

EXAMPLE 10 a. 2-(n-Butyryl)androstan-17β-ol-3-one was prepared from 27.68 g. of 17β-(n-butyryloxy)androstan-3-one (m.p. 97°-99 C.), 24.3 g. of n-butyric anhydride and 27.1 g. of n-butyric acid in the presence of boron trifluoride according to the manipulative procedure described above in Example 9, part (a). The initial product obtained, 2-(n-butyryl)-17β-(n-butyryloxy)androstan-3-one was saponified by allowing it to stand with 35 percent sodium hydroxide at room temperature, and the resulting 17β-hydroxy compound was chromatographed on silica gel to give 25.14 g. of 2-(n-butyryl)-androstan-17βol-3-one, m.p. 130.8°-132.8° C. (corr.), colorless prisms from methanol, $[\alpha]_D^{25} = +55.8 \pm 0.1°$ (1 percent in chloroform); ultraviolet maximum at 290 mμ (E = 9,470).

Anal. Calcd. for $C_{23}H_{36}O_3$: C, 76.62; H, 10.07.
Found: C, 76.70; H, 10.10.

b. 17β-Hydroxyandrostano[3.2-c]-5'-(n-propyl)pyrazole [VI; R is $(CH_2)_2CH_3$, R' and R" are H, X is $H_2$, Z is OH, Y and Y' are $CH_3$] was prepared from 3.00 g. of 2-(n-butyryl)androstan-17β-ol-3-one and 0.55 g. of hydrazine hydrate in 50 ml. of absolute ethanol. There was thus obtained 17β-hydroxyandrostano[3.2-c]-5'-(n-propyl)pyrazole, m.p. 169.4°-172.0° C. (corr.), needles from ethyl acetate, $[\alpha]_D^{25} = +56.5 \pm 0.2°$ (1 percent in chloroform); ultraviolet maximum at 244 mμ (E = 5,800).

Anal. Calcd. for $C_{23}H_{36}N_2O$: C, 77.48; H, 10.18; N, 7.86.
Found: C, 77.38; H, 10.20; N, 7.84.

EXAMPLE 11 a. 2-Hydroxymethylene-4,4-dimethyl-5-androsten-17β-ol-3-one was prepared from 6.69 g. of 4,4-dimethyl-5-androsten-17β-ol-3-one, 9.5 ml. of ethyl formate, 0.95 g. of sodium and 18-20 ml. of ethanol in 65 ml. of pyridine according to the manipulative procedure described above in Example 4, part (a). There was thus obtained 5.21 g. of 2-hydroxymethylene-4,4-dimethyl-5-androsten-17β-ol-3-one.

b. 4,4-Dimethyl-17β-hydroxy-5-androsteno[3.2-c]pyrazole was prepared from 2.07 g. of 2-hydroxymethylene-4,4-dimethyl-5-androsten-17β-ol-3-one and 0.88 ml. of hydrazine hydrate in 70 ml. of ethanol. The product was recrystallized from aqueous ethanol and dried over phosphorus pentoxide for 2 days at 60° C. to give 4,4-dimethyl-17β-hydroxy-5-androsteno[3.2-c]-pyrazole, m.p. 231.0°-233.6° C. (corr.), $[\alpha]_D^{25} = -20.1 \pm 0.4°$ (1 percent in chloroform); ultraviolet maximum at 224 mμ (E=5,500).

Anal. Calcd. for $C_{22}H_{32}ON_2$: C, 77.60; H, 9.47; N, 8.20.
Found: C, 78.17; H, 9.69; N, 8.40.

EXAMPLE 12 a. 2-Hydroxymethylene-4,4,17α-trimethylandrostan-17β-ol-3-one was prepared from 6 g. of 4,4,17α-trimethylandrostan-17β-ol-3-one, 10 ml. of ethyl formate, 0.85 g. of sodium and 15 ml. of ethanol in 125 ml. of pyridine according to the manipulative procedure described above in Example 4, part (a). There was thus obtained 5.0 g. of 2-hydroxymethylene-4,4,17α-trimethylandrostan-17β-ol-3-one, m.p. 150°-154° C. (uncorr.).

b. 4,4,17α-Trimethyl-17β-hydroxyandrostano[3.2-c]pyrazole was prepared from 2.5 g. of 2-hydroxymethylene-4,4,17α-trimethyl-androstan-17β-ol-3-one and 0.36 g. of hydrazine hydrate in 50 ml. of methanol. There was thus obtained 2.25 g. of 4,4,17α-trimethyl-17β-hydroxyandrostano[3.2-c]pyrazole, m.p. 269.2°-274.6° C. (corr.) when recrystallized from methanol; $[\alpha]_D^{25} = +4.7 \pm 0.1°$ (1 percent in 95 percent ethanol); ultraviolet maximum at 223 mμ (E=4,930).

Anal. Calcd. for $C_{23}H_{36}N_2O$: C, 77.48; H, 10.18; N, 7.86.
Found: C, 77.46; H, 10.21; N, 7.99.

EXAMPLE 13 a. 2-Hydroxymethylene-6α,17α-dimethyl-4-androsten-17β-ol-3-one was prepared from 5.0 g. of 6α,17α-dimethyl-4-androsten-17β-ol-3-one, 5.0 ml. of ethyl formate and 1.5 g. of sodium hydride in 100 ml. of benzene according to the manipulative procedure described above in Example 2.

b. 6α,17α-Dimethyl-17β-hydroxy-4-androsteno[3.2-c]pyrazole was prepared from the entire crude product from part (a) above (about 4-5 g.) and 1.0 g. of hydrazine hydrate in 50 ml. of absolute ethanol. The product was recrystallized from ethyl acetate to give 3.39 g. of 6α,17α-dimethyl-17β-hydroxy-4-androsteno[3.2-c]-pyrazole, needles, m.p. 170.0°-178.6° C. (dec.)(corr.); ultraviolet maximum at 262 mμ (E=9,200).

Anal. Calcd. for $C_{22}H_{32}N_2O$: C, 77.60; H, 9.47; N, 8.23.
Found: C, 77.30; H, 9.69; N, 8.33.

EXAMPLE 14 a. Allopregnan-3β-ol-20-one 20-ethylene glycol ketal.

A mixture of 27.4 g. (0.086 mole) of allopregnan-3β-ol-20-one, 33 ml. of ethylene glycol, 700 ml. of benzene and 1 g. of p-toluenesulfonic acid was refluxed for 78 hours with a water separator in the system. The reaction mixture was then cooled and shaken with 100 ml. of 2N sodium hydroxide solution, and the resulting mixture was filtered to collect 20.5 g. of allopregnan-3β-ol-20-one 20-ethylene glycol ketal, m.p. 166°-169° C. (uncorr.). When the latter was recrystallized from acetone, the compound was obtained in the form of colorless plates, m.p. 172.5°-175° C. (uncorr.).

b. Allopregnane-3,20-dione 20-ethylene glycol ketal.

Chromic oxide (26.6 g.) was added in small portions to 425 ml. of pyridine at 25°-30° C. To this mixture was added all at once a solution of 19.5 g. (0.054 mole) of allopregnan-3β-ol-20-one 20-ethylene glycol ketal in 250 ml. of pyridine. The reaction mixture was stirred at room temperature for 18 hours, diluted with 1 liter of hot benzene and filtered. The filtered solid was washed with 500 ml. of hot benzene, and the combined filtrates were washed with four 500 ml. portions of water followed by one 200 ml. portion of saturated sodium chloride solution. The organic solvent was then concentrated in vacuo, and the residue was triturated with 50 ml. of methanol. Filtration of the mixture and concentration of the filtrate to a volume of 20 ml. gave a small additional amount of solid product. The combined solid product was recrystallized from ethyl acetate using activated charcoal for decolorizing purposes to give 12.6 g. of allopregnane-3,20-dione 20-ethylene glycol ketal in the form of blades and plates, m.p. 190°–191.5° C. (uncorr.).

c. 2-Hydroxymethyleneallopregnane-3,20-dione 20-ethylene glycol ketal was prepared from 2.45 g. of allopregnane-3,20-dione 20-ethylene glycol ketal, 20 ml. of ethyl formate, and sodium methoxide (from 0.33 g. of sodium and 15 ml. of methanol) in 70 ml. of pyridine according to the manipulative procedure described above in Example 4, part (a). There was thus obtained 2.64 g. of 2-hydroxymethyleneallopregnane-3,20-dione 20-ethylene glycol ketal, used in the next reaction without further purification.

A solution of 2.5 g. of 2-hydroxymethyleneallopregnane-3,20-dione 20-ethylene glycol ketal and 2 ml. of 2N hydrochloric acid in 50 ml. of ethanol was warmed at 50° C. for fifteen minutes and heated to boiling for 2 minutes. The solution was then concentrated and the residue recrystallized from a methylene chloride-ether-pentane (1:1:2) mixture and finally from a methylene chloride-pentane mixture to give 2-hydroxymethyleneallopregnane-3,20-dione, m.p. 198.6°–203.2° C. (corr.), $[\alpha]_D^{25} = +137.2 \pm 0.1°$ (1 percent in chloroform).

Anal. Calcd. for $C_{22}H_{32}O_3$: C, 76.70; H, 9.36.
Found: C, 76.41; H, 9.23.

d. 20-Oxoallopregnano[3.2-c]pyrazole 20-ethylene glycol ketal was prepared from 2.56 g. of 2-hydroxymethyleneallopregnane-3,20-dione 20-ethylene glycol ketal and 0.50 g. of hydrazine hydrate in 20 ml. of ethanol. There was thus obtained 2.1 g. of 20-oxoallopregnano[3.2-c]pyrazole 20-ethylene glycol ketal.

e. 20-Oxoallopregnano[3.2-c]pyrazole [VI; R and R' are H, R'' is COCH₃, X is H₂, Z is H, Y and Y' are CH₃].

The 20-oxoallopregnano[3.2-c]pyrazole 20-ethylene glycol ketal obtained in part (d) above was suspended in 60 ml. of ethanol and 3 ml. of 2N hydrochloric acid was added with stirring. After the solid had dissolved (about 2 minutes), 4 ml. of water was added and the solution allowed to stand for 20 minutes. The solution was then made basic with dilute ammonium hydroxide and 125 ml. of water was added. The solid product was collected by filtration and recrystallized twice from ethanol to give 1.4 g. of 20-oxoallopregnano[3.2-c]pyrazole in the form of colorless blades, m.p. 250°–263.8° C. (corr.), $[\alpha]_D^{25} = +135.9 \pm 0.1°$ (1 percent in chloroform).

Anal. Calcd. for $C_{22}H_{32}N_2O$: C, 77.60; H, 9.47; N, 8.23.
Found: C, 77.94; H, 9.44; N, 8.16.

EXAMPLE 15

17α,21-Dihydroxy-11,20-dioxo-4-pregneno[3.2-c]pyrazole [VII; R and R' are H, R'' is COCH₂OH, X is O, Z is OH, Y and Y' are CH₃].

a. Without protection of the 20-oxo group

21-Acetoxy-4-pregnen-17α-ol-3,11,20-trione (cortisone acetate) (2.0 g., 0.005 mole), 4.0 ml. of ethyl formate and 1.0 g. of sodium hydride in 100 ml. of pyridine was caused to react according to the manipulative procedure described above in Example 4, part (a), all operations being carried out in a nitrogen atmosphere. In the process the 21-acetoxy group was saponified to give 1.3 g. of 2-hydroxymethylene-4-pregnene-17α,21-diol-3,11,20-trione; ultraviolet maxima at 246 and 293 mμ (E = 8,000 and 4,300, respectively), characteristic of the 2-hydroxymethylene-Δ⁴-3-oxo grouping.

2-Hydroxymethylene-4-pregnene-17α,21-diol-3,11,20-trione (1.3 g.) and 0.2 g. of hydrazine hydrate in 100 ml. of methanol were caused to react. There was thus obtained 0.7 g. of 17α,21-dihydroxy-11,20-dioxo-4-pregneno[3.2-c]pyrazole, m.p. above 320° C.; ultraviolet maximum at 260 mμ. The compound gave a positive Tollens test and triphenyltetrazolium test, characteristic of the ketal side chain.

b. By protection of the 20-oxo group as the 17,20;20,21-bis-methylenedioxy derivative 1. 2-Hydroxymethylene-4-pregnene-17α,21-diol-3,11,20-trione 17,20;20,21-bismethylenedioxy derivative was prepared from 10.0 g. of 4-pregnene-17α,21-diol-3,11,20-trione 17,20;20,21-bismethylenedioxy derivative, 15 ml. of ethyl formate and 1.3 g. of sodium hydride according to the manipulative procedure described above in Example 2. There was thus obtained 8.9 g. of 2-hydroxymethylene-4-pregnene-17α,21-diol-3,11,20-trione 17,20;20,21-bismethylenedioxy derivative; ultraviolet maxima at 252 and 309 mμ (E = 9,700 and 5,500, respectively). This material was used directly in the following reaction.

2. 17α,21-Dihydroxy-11,20-dioxo-4-pregneno[3.2-c]pyrazole 17,20;20,21-bismethylenedioxy derivative was prepared from 9.6 g. 2-hydroxymethylene-4-pregnene-17α,21-diol-3,11,20-trione 17,20; 20,21-bismethylenedioxy derivative and 4.0 ml. of hydrazine hydrate in 250 ml. of ethanol. There was thus obtained 8.2 g. of 17α,21-dihydroxy-11,20-dioxo-4-pregneno[3.2-c]pyrazole 17,20;20,21-bismethylenedioxy derivative, m.p. above 300° C. (corr.) when recrystallized from dimethylformamide.

Anal. Calcd. for $C_{24}H_{30}N_2O_5$: C, 67.37; H, 6.88; O, 19.10.
Found: C, 67.58; H, 7.09; O, 18.76.

3. 17α,21-Dihydroxy-11,20-dioxo-4-pregneno[3.2-c]pyrazole was prepared by heating 17α,21-dihydroxy-11,20-dioxo-4-pregneno-[3.2-c]pyrazole 17,20; 20,21-bismethylenedioxy derivative with dilute formic acid. The product had properties similar to those of the product obtained in part (a) above.

EXAMPLE 16

4,4-Dimethyl-20-oxo-5-pregneno[3.2-c]pyrazole, m.p. 175°–178° C., was prepared by introduction of a hydroxymethylene group into the 2-position of 4,4-dimethyl-5-pregnene-3,20-dione 20-ethylene glycol ketal according to the manipulative procedure described above in Example 1, part (a), followed by reacting the resulting 2-hydroxymethylene-4,4-dimethyl-5-pregnene-3,20-dione 20-ethylene glycol ketal, peach-colored solid, m.p. 182°–183.5° C., $[\alpha]_D^{25} = -14.6°$ (1 percent in chloroform) with hydrazine according to the manipulative procedure described above in Example 1, part (b), and hydrolyzing the ketal group by heating with dilute ethanolic hydrogen chloride.

EXAMPLE 17

17β-Hydroxy-17α-propargylandrostano[3.2-c]pyrazole [VI; R and R' are H, R'' is -CH₂C ≡ CH, X is H₂, Z is OH, Y and Y' are CH₃] can be prepared by introduction of a hydroxymethylene group into the 2-position of 17α-propargylandrostan-17β-ol-3-one according to the manipulative procedure described above in Example 1, part (a), followed by reacting the resulting 2-hydroxymethylene-17α-propargylandrostan-17β-ol-3-one with hydrazine according to the manipulative procedure described above in Example 1, part (b).

EXAMPLE 18

20,21-Dihydroxy-4-pregneno[3.2-c]pyrazole [VII; R and R' are H, R'' is C(OH)CH₂OH, X is H₂, Z is H, Y and Y' are CH₃] can be prepared by introduction of a hydroxymethylene group into the 2-position of 4-pregnene-20,21-diol-3-one according to the manipulative procedure described above in Example 1, part (a), followed by reacting the resulting 2-hydroxymethylene-4-pregnene-20,21-diol-3-one with hydrazine according to the manipulative procedure described above in Example 1, part (b).

EXAMPLE 19

16α,17α,21-Trihydroxy-20-oxo-9β,11β-oxido-4-pregneno [3.2-c]-pyrazole can be prepared by introduction of a hydroxymethylene group into the 2-position of 4-pregnene-16α,17α,21-triol-3,20-dione-9β,11β-oxide 16α,21-diacetate 20-monoethylene glycol ketal according to the manipulative procedure described above in Example 1, part (a), followed by reacting the resulting 2-hydroxymethylene-4-pregnene-16α,17α,21-triol-3,20-dione-9β,11β-oxide 20-monoethylene glycol ketal with hydrazine according to the manipulative procedure described above in Example 1, part (b) and hydrolyzing the ketal group by heating with dilute ethanolic hydrogen chloride.

EXAMPLE 20

17α,21-Dihydroxy-11,20-dioxo-1,4-pregnadieno[3.2-c]pyrazole can be prepared by introduction of a hydroxymethylene group into the 2-position of 4-pregnene-17α,21-diol-3,11,20-trione 20-mono-ethylene glycol ketal according to the manipulative procedure described above in Example 1, part (a), reacting the resulting product with sulfonyl chloride to produce 2-chloro-2-formyl-4-pregnene-17α,21-diol-3,11,20-trione 20-monoethylene glycol ketal, heating the latter with collidine to effect dehydrochlorination to yield 2-formyl-1,4-pregnadiene-17α,21-diol-3,11,20-trione 20-monoethylene glycol ketal, and finally reacting the latter with hydrazine according to the manipulative procedure described above in Example 1, part (b), and hydrolyzing the ketal group by heating with dilute ethanolic hydrogen chloride.

EXAMPLE 21 a. 2-Hydroxymethylene-4-pregnene-20,21-diol-3-one 20,21-acetonide was prepared from 1.55 g. of 4-pregnene-20,21-diol-3-one 20,21-acetonide (α-form, m.p. 122°–124° C.), 10 ml. of ethyl formate and 0.48 g. of sodium hydride according to the manipulative procedure described above in Example 2. The total crude product was used directly in the following reaction.

b. 20,21-Dihydroxy-4-pregneno[3.2-c]pyrazole 20,21-acetonide was prepared from the total product from part (a) above and 0.30 g. of hydrazine hydrate in 15 ml. of ethanol. The product was recrystallized from methanol to give 0.6 g. of 20,21-dihydroxy-4-pregneno[3.2-c]pyrazole 20,21-acetonide in the form of yellow blades, m.p. 201°–204° C. (uncorr.); ultraviolet maximum at 261 mµ (E = 9,900).

EXAMPLE 22 a. 2-Hydroxymethylene-17α-methyl-4-androsten-17β-ol-3-one in the form of the copper chelate (2.07 g., m.p. 205°–220° C.) was brominated with 1.46 g. of bromine in 100 ml. of carbon tetrachloride to give 2-bromo-2-hydroxymethylene-17α-methyl-4-androsten-17β-ol-3-one. The latter can be dehydrobrominated by heating with collidine to give 2-formyl-17α-methyl-1,4-androstadien-17β-ol-3-one.

b. 17β-Hydroxy-17α-methyl-1,4-androstadieno[3.2-c]pyrazole can be prepared by reacting 2-formyl-17α-methyl-1,4-androstadien-17β-ol-3-one with hydrazine in ethanol solution.

EXAMPLE 23

17α,21-Dihydroxy-11,20-dioxo-4,6-pregnadieno[3.2-c]pyrazole [VIII; R and R' are H, R" is COCH$_2$OH, X is O, Z is OH, Y and Y' are CH$_3$] can be prepared by introduction of a hydroxymethylene group into the 2-position of 21-acetoxy-4,6-pregnadien-17α-ol-3,11,20-trione 20-monoethylene glycol ketal according to the manipulative procedure described above in Example 1, part (a), followed by reacting the resulting 2-hydroxymethylene-4,6-pregnadiene-17α,21-diol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 24

17α,21-Dihydroxy-11,20-dioxo-6-methyl-4-pregneno[3.2-c]pyrazole can be prepared by introduction of a hydroxymethylene group into the 2-position of 21-acetoxy-6-methyl-4-pregnen-17α-ol-3,11,20-trione 20-monoethylene glycol ketal according to the manipulative procedure described above in Example 1, part (a), followed by reacting the resulting 2-hydroxymethylene-6-methyl-4-pregnene-17α,21-diol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 25

17α,21-Dihydroxy-11,20-dioxo-9-fluoro-6-methyl-4-pregneno[3.2-c]-pyrazole can be prepared by introduction of a hydroxymethylene group into the 2-position of 21-acetoxy-9-fluoro-6-methyl-4-pregnen-17α-ol-3,11,20-trione 20-monoethylene glycol ketal according to the manipulative procedure described above in Example 1, part (a), followed by reacting the resulting 2-hydroxymethylene-9-fluoro-6-methyl-4-pregnene-17α,21-diol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 26

2-Methyl-17α,21-dihydroxy-11,20-dioxo-4-pregneno[3.2-c]pyrazole can be prepared by introduction of a formyl group into the 2-position of 21-acetoxy-2-methyl-4-pregnen-17α-ol-3,11,20-trione 20-monoethylene glycol ketal according to the manipulative procedure described above in Example 1, part (a), followed by reacting the resulting 2-formyl-2-methyl-4-pregnene-17α,21-diol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 27

2-Methyl-11β,16α,17α,21-tetrahydroxy-20-oxo-4-pregneno[3.2-c]pyrazole can be prepared by introduction of a formyl group into the 2-position of 21-acetoxy-2-methyl-4-pregnene-11β,16α,17α-triol-3,20-dione 20-monoethylene glycol ketal according to the manipulative procedure described above in Example 1, part (a), followed by reacting the resulting 2-formyl-2-methyl-4-pregnene-11β,16α,17α,21-tetrol-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 28

16α,17α,21-Trihydroxy-11,20-dioxo-4-pregneno[3.2-c]pyrazole can be prepared by introduction of a hydroxymethylene group into the 2-position of 16α,21-diacetoxy-4-pregnene-17α-ol-3,11,20-trione 20-monoethylene glycol ketal according to the manipulative procedure described above in Example 1, part (a), followed by reacting the resulting 2-hydroxymethylene-4-pregnene-16α,17α,21-triol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 29

4,17(20)-Pregnadiene-11β,21-diol-3-one can be caused to react first with ethyl formate and sodium hydride and the resulting 2-hydroxymethylene-4,17(20)-pregnadiene-11β,21-diol-3-one then reacted with hydrazine, according to the methods of the preceding examples, to give 11β,21-dihydroxy-4,17(20)-pregnadieno[3.2-c]pyrazole.

EXAMPLE 30

6β,17β-Dihydroxyandrostano[3.2-c]pyrazole can be prepared by introduction of a hydroxymethylene group into the 2-position of androstane-6β,17β-diol-3-one according to the manipulative procedure described above in Example 1, part (a), followed by reacting the resulting 2-hydroxymethyleneandrostane-6β,17β-diol-3-one with hydrazine according to the manipulative procedure described above in Example 1, part (b).

EXAMPLE 31

17α-Ethynyl-17β-hydroxy-11-oxo-4-androsteno[3.2-c]pyrazole [VII; R and R' are H, R" is C ≡ CH, X is O, Z is OH, Y and Y' are CH₃] can be prepared by introduction of a hydroxymethylene group into the 2-position of 17α-ethynyl-4-androsten-17β-ol-3,11-dione according to the manipulative procedure described above in Example 1, part (a), followed by reacting the resulting 2-hydroxymethylene-17α-ethynyl-4-androsten-17β-ol-3,11-dione with hydrazine according to the manipulative procedure described above in Example 1, part (b).

EXAMPLE 32

6β,17β-Dihydroxy-4-androsteno[3.2-c]pyrazole can be prepared by introduction of a hydroxymethylene group into the 2-position of 4-androstene-6β,17β-diol-3-one according to the manipulative procedure described above in Example 1, part (a), followed by reacting the resulting 2-hydroxymethylene-4-androstene-6β,17β-diol-3-one with hydrazine according to the manipulative procedure described above in Example 1, part (b).

EXAMPLE 33

17α-Methyl-6β,17β-dihydroxy-4-androsteno[3.2-c]pyrazole can be prepared by introduction of a hydroxymethylene group into the 2-position of 17α-methyl-4-androstene-6β,17β-diol-3-one according to the manipulative procedure described above in Example 1, part (a), followed by reacting the resulting 2-hydroxymethylene-17α-methyl-4-androstene-6β,17β-diol-3-one with hydrazine according to the manipulative procedure described above in Example 1, part (b).

EXAMPLE 34

14α,17β-Dihydroxy-4-androsteno[3.2-c]pyrazole can be prepared by introduction of a hydroxymethylene group into the 2-position of 4-androstene-14α,17β-diol-3-one according to the manipulative procedure described above in Example 1, part (a), followed by reacting the resulting 2-hydroxymethylene-4-androstene-14α,17β-diol-3-one with hydrazine according to the manipulative procedure described above in Example 1, part (b).

EXAMPLE 35

16β-Methyl-17β-hydroxy-4-androsteno[3.2-c]pyrazole can be prepared by introduction of a hydroxymethylene group into the 2-position of 16β-methyl-4-androsten-17β-ol-3-one according to the manipulative procedure described above in Example 1, part (a), followed by reacting the resulting 2-hydroxymethylene-16β-methyl-4-androsten-17β-ol-3-one with hydrazine according to the manipulative procedure described above in Example 1, part (b).

EXAMPLE 36

11α,17β-Dihydroxy-4-androsteno[3.2-c]pyrazole [VII; R, R' and R" are H, X is (H)(OH), Z is OH, Y and Y' are CH₃] can be prepared by introduction of a hydroxymethylene group into the 2-position of 4-androstene-11α,17β-diol-3-one according to the manipulative procedure described above in Example 1, part (a), followed by reacting the resulting 2-hydroxymethylene-4-androstene-11α,17β-diol-3-one with hydrazine according to the manipulative procedure described above in Example 1, part (b).

EXAMPLE 37

6β,17β-Dihydroxy-19-nor-4-androsteno[3.2-c]pyrazole can be prepared by introduction of a hydroxymethylene group into the 2-position of 19-nor-4-androstene-6β,17β-diol-3-one according to the manipulative procedure described above in Example 1, part (a), followed by reacting the resulting 2-hydroxymethylene-19-nor-4-androstene-6β,17β-diol-3-one with hydrazine according to the manipulative procedure described above in Example 1, part (b).

EXAMPLE 38

4-Bromo-17α-methyl-17β-hydroxy-4-androsteno[3.2-c]pyrazole can be prepared by introduction of a hydroxymethylene group into the 2-position of 4-bromo-17α-methyl-4-androsten-17β-ol-3-one according to the manipulative procedure described above in Example 1, part (a), followed by reacting the resulting 2-hydroxymethylene-4-bromo-17α-methyl-4-androsten-17β-ol-3-one with hydrazine according to the manipulative procedure described above in Example 1, part (b).

EXAMPLE 39

4-Methyl-17β-hydroxy-4-androsteno[3.2-c]pyrazole can be prepared by introduction of a hydroxymethylene group into the 2-position of 4-methyl-4-androsten-17β-ol-3-one according to the manipulative procedure described above in Example 1, part (a), followed by reacting the resulting 2-hydroxymethylene-4-methyl-4-androsten-17β-ol-3-one with hydrazine according to the manipulative procedure described above in Example 1, part (b).

EXAMPLE 40

2α,17α-Dimethyl-17β-hydroxy-4-androsteno[3.2-c]pyrazole can be prepared by introduction of a formyl group into the 2-position of 2α,17α-dimethyl-4-androsten-17β-ol-3-one according to the manipulative procedure described in Example 1, part (a), followed by reacting the resulting 2-formyl-2α,17α-dimethyl-4-androsten-17β-ol-3-one with hydrazine according to the manipulative procedure described above in Example 1, part (b).

EXAMPLE 41

17α-Ethynyl-17β-hydroxy-4,6-androstadieno[3.2-c]pyrazole [VIII; R and R' are H, R'' is C ≡ CH, X is $H_2$, Z is OH, Y and Y' are $CH_3$] can be prepared by introduction of a hydroxymethylene group into the 2-position of 17α-ethynyl-4,6-androstadien-17β-ol-3-one according to the manipulative procedure described above in Example 1, part (a), followed by reacting the resulting 2-hydroxymethylene-17α-ethynyl-4,6-androstadien-17β-ol-3-one with hydrazine according to the manipulative procedure described above in Example 1, part (b).

EXAMPLE 42

6β,17α,21-Trihydroxy-20-oxoallopregnano[3.2-c]pyrazole can be prepared by introduction of a hydroxymethylene group into the 2-position of allopregnane-6β,17α,21-triol-3,20-dione 20-monoethylene glycol ketal according to the manipulative procedure described above in Example 1, part (a), followed by reacting the resulting 2-hydroxymethyleneallopregnane-6β,17α,21-triol-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 43

12α,17α,21-Trihydroxy-20-oxo-4-pregneno[3.2-c]pyrazole can be prepared by introduction of a hydroxymethylene group into the 2-position of 21-acetoxy-4-pregnene-12α,17α-diol-3,20-dione 20-monoethylene glycol ketal according to the manipulative procedure described above in Example 1, part (a), followed by reacting the resulting 2-hydroxymethylene-4-pregnene-12α,17α,21-triol-3,20-dione 20-monethylene glycol ketal with hydrazine according to the manipulative procedure described above in Example 1, part (b) and hydrolyzing the ketal group by heating with dilute ethanolic hydrochloric acid.

EXAMPLE 44

17α,21-Dihydroxy-12,20-dioxoallopregnano[3.2-c]pyrazole can be prepared by introduction of a hydroxymethylene group into the 2-position of 21-acetoxyallopregnan-17α-ol-3,12,20-trione 20-monoethylene glycol ketal according to the manipulative procedure described above in Example 1, part (a), followed by reacting the resulting 2-hydroxymethyleneallopregnane-17α,21-diol-3,12,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 45

20-Oxo-4,11-pregnadieno[3.2-c]pyrazole can be prepared by introduction of a hydroxymethylene group into the 2-position of 4,11-pregnadiene-3,20-dione 20-monoethylene glycol ketal according to the manipulative procedure described above in Example 1, part (a), followed by reacting the resulting 2-hydroxymethylene-4,11-pregnadiene-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 46

17α-Methyl-20-oxo-4-pregneno[3.2-c]pyrazole can be prepared by introduction of a hydroxymethylene group into the 2-position of 17α-methyl-4-pregnene-3,20-dione 20-monoethylene glycol ketal according to the manipulative procedure described above in Example 1, part (a), followed by reacting the resulting 2-hydroxymethylene-17α-methyl-4-pregnene-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 47

6β-Hydroxy-20-oxo-4-pregneno[3.2-c]pyrazole can be prepared by introduction of a hydroxymethylene group into the 2-position of 4-pregnen-6β-ol-3,20-dione 20-monoethylene glycol ketal according to the manipulative procedure described above in Example 1, part (a), followed by reacting the resulting 2-hydroxymethylene-4-pregnen-6β-ol-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 48

7β,11β-Dihydroxy-20-oxo-4-pregneno[3.2-c]pyrazole can be prepared by introduction of a hydroxymethylene group into the 2-position of 4-pregnene-7β,11β-diol-3,20-dione 20-monoethylene glycol ketal according to the manipulative procedure described above in Example 1, part (a), followed by reacting the resulting 2-hydroxymethylene-4-pregnene-7β,11β-diol-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 49

12α-Cholro-17α,21-dihydroxy-11,20-dioxo-4-pregneno[3.2-c]pyrazole can be prepared by introduction of a hydroxymethylene group into the 2-position of 12α-chloro-4-pregnene-17α,21-diol-3,11,20-trione 20-monoethylene glycol ketal according to the manipulative procedure described above in Example 1, part (a), followed by reacting the resulting 2-hydroxymethylene-12α-chloro-4-pregnene-17α,21-diol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 50

20-Oxo-18,19-bisnor-4-pregneno[3.2-]pyrazole can be prepared by introduction of a hydroxymethylene group into the 2-position of 18,19-bisnor-4-pregnene-3,20-dione 20-monoethylene glycol ketal according to the manipulative procedure described above in Example 1, part (a), followed by reacting the resulting 2-hydroxymethylene-18,19-bisnor-4-pregnene-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 51

4-Bromo-17α,21-dihydroxy-11,20-dioxo-4-pregneno[3.2-c]pyrazole can be prepared by introduction of a hydroxymethylene group into the 2-position of 21-acetoxy-4-bromo-4-pregnen-17α-ol-3,11,20-trione 20-monoethylene glycol ketal according to the manipulative procedure described above in Example 1, part (a), followed by reacting the resulting 2-hydroxymethylene-4-bromo-4-pregnene-17α,21-diol-3,11,20-trione 20-monoethylene glycol ketal with hydrazine according to the manipulative procedure described above in Example 1, part (b) and hydrolyzing the ketal group by heating with dilute ethanolic hydrochloric acid.

EXAMPLE 52

7α,12α-Dihydroxy-20-oxo-4-pregneno[3.2-c]pyrazole can be prepared by introduction of a hydroxymethylene group into the 2-position of 4-pregnene-7α,12α-diol-3,20-dione 20-monoethylene glycol ketal according to the manipulative procedure described above in Example 1, part (a), followed by reacting the resulting 2-hydroxymethylene-4-pregnene-7α,12α-diol-3,20-dione 20-monoethylene glycol ketal with hydrazine according to the manipulative procedure described above in Example 1, part (b) and hydrolyzing the ketal group by heating with dilute ethanolic hydrochloric acid.

EXAMPLE 53

The 7,20-bis(ethylene glycol ketal) of allopregnane-3,7,20-trione (prepared by ketalization of allopregnan-3β-ol-7,20-dione and oxidation by the Oppenauer procedure) can be converted to 7,20-dioxoallopregnano[3.2-c]pyrazole by reacting with ethyl formate and sodium hydride in benzene solution, condensing the resulting 2-hydroxymethyleneallopregnane-3,7,20-trione 7,20-bis(ethylene glycol ketal) with hydrazine, and finally cleaving the ketal groupings with dilute acid according to the procedures described hereinabove.

EXAMPLE 54

17α-Ethyl-17β-hydroxy-7-oxoandrostano[3.2-c]pyrazole can be prepared by oxidation of 17α-ethylandrostane-3β,17β-diol-7-one ethylene glycol ketal by the Oppenauer procedure to 17α-ethylandrostan-17β-ol-3,7-dione ethylene glycol ketal, followed by introduction of a hydroxymethylene group into the 2-position, reaction of the resulting 2-hydroxymethylene-17α-ethylandrostan-17β-ol-3,7-dione 7-monoethylene glycol ketal with hydrazine and hydrolysis according the the procedures described hereinabove.

EXAMPLE 55

7-Oxoallopregnano[3.2-c]pyrazole can be prepared by oxidation of allopregnan-3β-ol-7-one ethylene glycol ketal by the Oppenauer procedure to allopregnane-3,7-dione 7-monoethylene glycol ketal, followed by introduction of a hydroxymethylene group into the 2-position, reaction of the resulting 2-hydroxymethyleneallopregnane-3,7-dione 7-monoethylene glycol ketal with hydrazine and hydrolysis according to the procedures described hereinabove.

EXAMPLE 56 a. 6α,17α-Dimethylandrostan-17β-ol-3-one.

A solution of 10.0 g. of 6α,17α-dimethyl-4-androsten-17β-ol-3-one in 150 ml. of ether and 150 ml. of tetrahydrofuran was added to 1 liter of anhydrous liquid ammonia. Lithium (2.5 g.) was added in small pieces and the mixture was stirred for 50 minutes. There was then added 20 g. of solid ammonium chloride in small portions, the ammonia was evaporated on a steam bath, 2.5 liters of water was added and the mixture stirred for 1 hour. The solid product which had separated was collected by filtration and dried, giving 9.89 g., m.p. 145°–200 ° C. (uncorr.). The latter product was dissolved in an ether-methylene dichloride-pentane (30:10:60) mixture and chromatographed on 500 g. of silica gel. The chromatographed product was recrystallized from ethyl acetate to give 6α,17α-dimethylandrostan-17β-ol-3-one in the form of colorless prismatic crystals, m.p. 181.6°–184.6° C. (corr.), $[\alpha]_D^{25}$ = +10.3 ± 0.2° (1 percent in chloroform).

Anal. Calcd. for $C_{21}H_{34}O_2$: C, 79.19; H, 10.76.

Found: C, 79.43; H, 11.00.

b. 2-Hydroxymethylene-6α,17α-dimethylandrostan-17β-ol-3-one was prepared from 3.47 g. of 6α,17α-dimethylandrostan-17β-ol-3-one, 4.04 g. of ethyl formate and 2.95 g. of sodium methoxide in 125 ml. of benzene according to the manipulative procedure described above in Example 1, part (a). There was thus obtained 2.74 g. of 2-hydroxymethylene-6α,17α-dimethylandrostan-17β-ol-3-one in the form of pale yellow prisms, m.p. 198°–199.8° C. (corr.) when recrystallized from acetone; $[\alpha]_D^{25}$ = +54.3 ± 0.1° (1 percent in chloroform); ultraviolet maximum at 285 mμ (E = 9,200).

Anal. Calcd. for $C_{22}H_{34}O_3$: C, 76.26; H, 9.89.

Found: C, 75.93; H, 9.63.

c. 6α,17α-Dimethyl-17β-hydroxyandrostano[3.2-c]pyrazole was prepared from 2.0 g. of 2-hydroxymethylene-6α,17α-dimethylandrostan-17β-ol-3-one and 0.35 g. of hydrazine hydrate in 75 ml. of ethanol. The product (1.81 g.) was recrystallized from ethyl acetate to give 6α,17α-dimethyl-17β-hydroxyandrostano-[3.2-c]pyrazole, m.p. 156.0°–174.0° C. (dec.)(corr.), $[\alpha]_D^{25}$ = +44.8 ± 0.1° (1 percent in chloroform); ultraviolet maximum at 225 mμ (E = 4,900).

Anal. Calcd. for $C_{22}H_{34}N_2O$: C, 77.14; H, 10.01; N, 8.18.

Found: C, 77.35; H, 10.10; N, 8.28.

EXAMPLE 57 a. 2-Hydroxymethylene-17α-vinylandrostan-17β-ol-3-one was prepared from 10.70 g. of 17α-vinylandrostan-17β-ol-3-one, 27.1 ml. of ethyl formate and 5.29 g. of sodium hydride according the the manipulative procedure described above in Example 2. There was thus obtained 6.22 g. of 2-hydroxymethylene-17α-vinylandrostan-17β-ol-3-one, used directly without purification in the following reaction.

b. 17β-Hydroxy-17α-vinylandrostano[3.2-c]pyrazole [VI; R and R' are H, R'' is CH = $CH_2$, X is $H_2$, Z is OH, Y and Y' are $CH_3$] was prepared from 1.72 g. of 2-hydroxymethylene-17α-vinylandrostan-17β-ol-3-one and 0.63 ml. of hydrazine hydrate in 50 ml. of ethanol. The resulting product was recrystallized from ethanol, chromatographed on silica gel and finally recrystallized from aqueous methanol to give 17β-hydroxy-17α-vinylandrostano[3.2-c]-pyrazole, m.p. above 300° C. (corr.), $[\alpha]_D^{25}$ = +24.5 ± 0.8° (1 percent in chloroform); ultraviolet maximum at 224 mμ (E = 7,100).

Anal. Calcd. for $C_{22}H_{32}N_2O$: C, 77.60; H, 9.47; N, 8.23; O, 4.70.

Found: C, 77.52; H, 9.70; N, 8.00; O, 4.50.

EXAMPLE 58 a. 2-Hydroxymethylenepregnane-3,20-dione.

Sodium methoxide was prepared by dissolving 0.73 g. (0.03 mole) of sodium hydride in 30 ml. of methanol and removing the excess methanol at 100° C. in vacuo. To the sodium methoxide were added 100 ml. of pyridine, 5.45 g. (0.0151 mole) of pregnane-3,20-dione 20-ethylene glycol ketal and then 30 ml. of ethyl formate. The reaction mixture was allowed to stand at room temperature for 21 hours and concentrated to dryness in vacuo below 45° C. The residue was dissolved in water, and carbon dioxide was passed into the solution until it reached a pH of 8. The precipitated product was collected by filtration and air dried, giving 5.9 g. of 2-hydroxymethylenepregnane-3,20 -dione 20-ethylene glycol ketal, suitable for conversion to the pyrazole derivative.

A 1.5 g. portion of the 2-hydroxymethylenepregnane-3,20-dione 20-ethylene glycol ketal was dissolved in 10 ml. of methanol, 2ml. of 2N hydrochloric acid was added, and the mixture was heated to boiling. The solution was set aside and was allowed to cool for 1 hour, diluted with 6 ml. of water, and the precipitated solid was collected by filtration and chromatographed on 25 g. of silica gel in pentane containing 25 percent ether. There was thus obtained 0.57 g. of 2-hydroxymethylenepregnane-3,20-dione, m.p. 139.8°–146.0° C. when recrystallized from methanol, $[\alpha]_D^{25} = +114.2 \pm 0.3°$ (1 percent in chloroform).

Anal. Calcd. for $C_{22}H_{32}O_3$: C, 76.70; H, 9.36.
  Found: C, 76.65; H, 9.62.

b. 20-Oxopregnano[3.2-c]pyrazole [VI; R and R' are H, R'' is $COCH_3$, X is $H_2$, Z is H, Y and Y' are $CH_3$] was prepared from 7.5 g. of 2-hydroxymethylenepregnane-3,20-dione and 1.5 g. of hydrazine hydrate in 50 ml. of ethanol. The product was chromatographed on silica gel and then recrystallized from methanol and a chloroform-methanol mixture to give 20-oxopregnano[3.2-c]pyrazole in the form of colorless prisms, m.p. 231.2°–253.0° C. (corr.), $[\alpha]_D^{25} = +91.6 \pm 0.1°$ (1% in chloroform).

Anal. Calcd. for $C_{22}H_{23}N_2O$: C, 77.60; H, 9.47; N, 8.23.
  Found: C, 77.48; H, 9.63; N, 8.08.

EXAMPLE 59 a. 2-Hydroxymethylene-17α-ethynylandrostan-17β-ol-3-one was prepared from 3.14 g. of 17α-ethynylandrostan-17β-ol-3-one, 4.8 ml. of ethyl formate, sodium methoxide (from 0.46 g. of sodium and 8–10 ml. of methanol) in 100 ml. of pyridine according to the manipulative procedure described above in Example 4, part (a). There was thus obtained 2.48 g. of 2-hydroxymethylene-17α-ethynylandrostan-17β-ol-3-one, used directly in the following reaction without further purification.

b. 17α-Ethynyl-17β-hydroxyandrostano[3.2-c]pyrazole [VI; R and R' are H, R'' is C≡CH, X is $H_2$, Z is OH, Y and Y' are $CH_3$] was prepared from 2.40 g. of 2-hydroxymethylene-17α-ethynylandrostan-17β-ol-3-one and 1.02 ml. of hydrazine hydrate in 90 ml. of ethanol. The product was recrystallized from ethanol to give 1.58 g. of 17α-ethynyl-17β-hydroxyandrostano[3.2-c]pyrazole, m.p. 237.4°–242.0° C. (corr.), $[\alpha]_D^{25} = +12.4 \pm 0.1°$ (1 percent in chloroform); ultraviolet maximum at 223 mμ (E=5,100).

Anal. Calcd. for $C_{22}H_{30}N_2O$: C, 78.06; H, 8.93; N, 8.28.
  Found: C, 77.87; H, 9.20; N, 8.37.

EXAMPLE 60 a. 2-Hydroxymethylene-17α-allyl-4-androsten-17β-ol-3-one was prepared from 7.3 g. of 17α-allyl-4-androsten-17β-ol-3-one (prepared by reacting dehydroepiandrosterone with allylmagnesium bromide followed by chromic acid oxidation of the 3-hydroxy group), 12 ml. of ethyl formate and sodium methoxide (from 1.2 g. of sodium in methanol) in 60 ml. of pyridine according to the manipulative procedure described above in Example 4, part (a). The crude product was used directly in the following reaction without purification.

b. 17α-Allyl-17β-hydroxy-4-androsteno[3.2-c]pyrazole [VII; R and R' are H, R'' is $CH_2CH=CH_2$, X is $H_2$, Z is OH, Y and Y' are $CH_3$] was prepared from 2.0 g. of 2-hydroxymethylene-17α-allyl-4-androsten-17β-ol-3-one and 1 ml. of hydrazine hydrate in 70 ml. of ethanol. The product was recrystallized from ethanol to give 17α-allyl-17β-hydroxy-4-androsteno[3.2-c]pyrazole in the form of colorless prisms, m.p. 239.8–248.2°CC. (corr.), $[\alpha]_D^{25} = +93.7 \pm 0.1°$ (1 percent in chloroform); ultraviolet maximum at 260 mμ (E = 10,500).

Anal. Calcd. for $C_{23}H_{32}N_2O$: C, 78.36; H, 9.15; O, 4.54.
  Found: C, 78.28; H, 9.48; O, 4.80.

EXAMPLE 61 a. 5α,6α-Epoxy-17α-(1-propynyl)androstane-3β,17β-diol 3-acetate.

A mixture of 2.82 g. of 17α-(1-propynyl)-5-androstene-3β,17β-diol 3-acetate [m.p. 195.4°–201.2° C. (corr.), $[\alpha]_D^{25} = -117.8 \pm 0.1°$ (1 percent in chloroform), prepared from 5-androsten-3β-ol-17-one and 1-propynylmagnesium bromide, followed by acetylation with acetic anhydride in pyridine], 13.5 ml. of peracetic acid and 2.00 g. of sodium acetate trihydrate in 200 ml. of chloroform was allowed to react at room temperature for about 2 days. The reaction mixture was then washed successively with 250 ml. of water, 250 ml. of 5 percent sodium carbonate solution, 250 ml. of 1N sodium hydroxide solution and 250 ml. of water. The washings were back extracted with ether, and the ether was successively washed with 100 ml. of water, 100 ml. of 1N sodium hydroxide solution, 100 ml. of water and 100 ml. of sodium chloride solution. The combined organic solutions were dried and concentrated, and the residue was dissolved in pentane containing 10 percent ether and chromatographed on silica gel. The chromatographed product was recrystallized from ethyl acetate to give 5α,6α-epoxy-17α-(1-propynyl)androstane-3β,17β-diol 3-acetate in the form of colorless prisms, m.p. 244.6°–250.6° C. (corr.), $[\alpha]_D^{25} = -111.3 \pm 0.1°$ (1 percent in chloroform).

Anal. Calcd. for $C_{24}H_{34}O_4$: C, 74.57; H, 8.95.
  Found: C, 74.74; H, 8.95.

b. 6β-Methyl-17α-(1-propynyl)androstane-3β,5α,17β-triol.

Methylmagnesium iodide was prepared from 36.28 g. of magnesium and 215.4 g. of methyl iodide in 625 ml. of ether. The ether was gradually removed by distillation and replaced with benzene. A solution of 34.13 g. of 5α,6α-epoxy-17α-(1-propynyl)androstane-3β,17β-diol 3-acetate in 2500 ml. of benzene was then added, and the mixture was refluxed for 2½ hours. Saturated ammonium chloride solution (250 ml.) was added, the mixture was filtered and the benzene solution concentrated. The residue was extracted with ethyl acetate and the total organic product isolated, giving about 20 g. of 6β-methyl-17α-(1-propynyl)androstane-3β,5α,17β-triol in the form of colorless rods, m.p. 212°–213.5° C. (uncorr.) when recrystallized from ethyl acetate.

c. 6β-Methyl-17α-(1-propynyl)androstane-5α,17β-diol-3-one.

A mixture of 18.2 mg. of 6β-methyl-17α-(1-propynyl)-androstane-3β,5α,17β-triol and 18.2 g. of chromic oxide in 360 ml. of pyridine was stirred for 24 hours at room temperature. The reaction mixture was worked up by extraction with ethyl acetate and washing with acid to remove pyridine. There was thus obtained 7.24 g. of 6β-methyl-17α-(1-propynyl)-androstane-5α,17β-diol-3-one, m.p. 249.2°–256.2° C. (corr.) when recrystallized from ethyl acetate; $[\alpha]_D^{25} = -43.7°$ (1 percent in chloroform).

Anal. Calcd. for $C_{23}H_{34}O_3$: C, 77.05; H, 9.56.
  Found: C, 77.20; H, 9.34.

d. 6α-Methyl-17α-(1-propynyl)-4-androsten-17β-ol-3-one.

A solution of 10.72 g. of 6β-methyl-17α-(1-propynyl)-androstane-5α,17β-diol-3-one and 5.00 g. of potassium hydroxide in 400 ml. of methanol and 40 ml. of water was refluxed for two hours under a nitrogen atmosphere. The reaction mixture was cooled, 5 ml. of acetic acid was added and the solution concentrated in vacuo. The residue was extracted with ethyl acetate, and the ethyl acetate solution was washed with ammonium carbonate solution, water and sodium chloride solution, dried and concentrated to give 5.51 g. of product, m.p. 85°–101° C. (uncorr.). The latter product was chromatographed on silica gel and recrystallized from aqueous ethanol to give 6α-methyl-17α-(1-propynyl)-4-androsten-17β-ol-3-one in the form of colorless plates, m.p. 90°–110° C. (uncorr.).

e. 2-Hydroxymethylene-6α-methyl-17α-(1-propynyl)-4-androsten-17β-ol-3-one was prepared from 4.27 g. of 6α-methyl-17α-(1-propynyl)-4-androsten-17β-ol-3-one, 10 ml. of ethyl formate and 2.40 g. of sodium hydride in 250 ml. of benzene according to the manipulative procedure described above in Example 2. There was thus obtained 4.70 g. of 2-hydroxymethylene-6α-methyl-17α-(1-propynyl)-4-androsten-17β-ol-3-one, m.p. 89°–93° C. (uncorr.).

f. 17β-Hydroxy-6α-methyl-17α-(1-propynyl)-4-androsteno[3.2-c]-pyrazole was prepared from 2.30 g. of 2-hydroxymethylene-6α-methyl-17α-(1-propynyl)-4-androsten-17β-ol-3-one and 0.38 g. of hydrazine hydrate in 50 ml. of ethanol. The product was chromatographed on silica gel and recrystallized from methanol to give 17β-hydroxy-6α-methyl-17α-(1-propynyl)-4-androsteno-[3.2-c]pyrazole, m.p. indefinite starting at 160.4° C. (corr.), $[\alpha]_D^{25} = +3.6 \pm 0.9°$ (1 percent in chloroform).

Anal. Calcd. for $C_{24}H_{32}N_2O$: C, 79.07; H, 8.85; N, 7.69.
Found: C, 79.04; H, 8.62; N, 7.48.

EXAMPLE 62 a. 2-Hydroxymethylene-17α-ethyl-4,6-androstadien-17β-ol-3-one was prepared from 4.08 g. of 17α-ethyl-4,6-androstadien-17β-ol-3-one, 5 ml. of ethyl formate and 1.4 g. of sodium hydride in 100 ml. of benzene according to the manipulative procedure described above in Example 2. The crude product was used directly in the following reaction.

b. 17β-Hydroxy-17α-ethyl-4,6-androstadieno[3.2-c]pyrazole [VIII; R and R' are H, R'' is $C_2H_5$, X is $H_2$, Z is OH, Y and Y' are $CH_3$] was prepared from 4.0 g. of 2-hydroxymethylene-17α-ethyl-4,6-androstadien-17β-ol-3-one and 1.5 ml. of hydrazine hydrate in 100 ml. of ethanol. The product was recrystallized from ethanol to give 3.16 g. of 17β-hydroxy-17α-ethyl-4,6-androstadieno[3.2-c]pyrazole in the form of light yellow crystals, m.p. above 300° C. (corr.), $[\alpha]_D^{25} = -55.4 \pm 0.1°$ (1 percent in pyridine); ultraviolet maxima at 220, 225, 232, 288, 297 and 308 mμ (E = 7,500, 8,500, 7,700, 8,400, 21,800 and 16,400, respectively).

Anal. Calcd. for $C_{22}H_{30}N_2O$: C, 78.06; H, 8.93; N, 8.28.
Found: C, 78.07; H, 8.99; N, 7.99.

EXAMPLE 63 a. 2-Hydroxymethylene-17α-proparyl-4-androsten-17β-ol-3-one was prepared from 4.2 g. of 17α-propargyl-4-androsten-17β-ol-3-one (prepared by reacting dehydroepiandrosterone acetate with propargylmagnesium bromide, hydrolysis, and oxidation by the Oppenauer procedure), 7 ml. of ethyl formate and 0.3 g. of sodium hydride in 120 ml. of benzene according to the manipulative procedure described above in Example 2. The crude product thus obtained was used directly in the following reaction.

b. 17β-Hydroxy-17α-propargyl-4-androsteno[3.2-c]pyrazole [VII; R and R' are H, R'' is $CH_2C \equiv CH$, X is $H_2$, Z is OH, Y and Y' are $CH_3$] was prepared from 2.5 g. of 2-hydroxymethylene-17α-propargyl-4-androsten-17β-ol-3-one and 1.1 ml. of hydrazine hydrate in 90 ml. of ethanol. The product was chromatographed on silica gel and then recrystallized first from methanol and then from aqueous ethanol to give 17β-hydroxy-17α-propargyl-4-androsteno[3.2-c]-pyrazole, m.p. 130.4–140.6°CC. (corr.), $[\alpha]_D^{25} = +75.4°$ (1 percent in chloroform); ultraviolet maximum at 261 mμ (E = 9,714).

Anal. Calcd. for $C_{23}H_{30}N_2O$: C, 78.81; H, 8.63; N, 7.99.
Found: C, 78.73; H, 8.70; N, 8.11.

EXAMPLE 64 a. 2-Hydroxymethylene-4-pregnene-11β,17α,21-triol-3,20-dione 17,20;20,21-bismethylenedioxy derivative was prepared from 17.25 g. of 4-pregnene-11β,17α,21-triol-3,20-dione 17,20;20,21-bismethylenedioxy derivative, 30 ml. of ethyl formate and 3.0 g. of sodium hydride according to the manipulative procedure described above in Example 2. There was thus obtained 17.0 g. of 2-hydroxymethylene-4-pregnene-11β,17α,21-triol-3,20-dione 17,20;20,21-bismethylenedioxy derivative as a yellow solid, used directly in the following reaction.

b. 11β,17α,21-Trihydroxy-20-oxo-4-pregneno[3.2-c]pyrazole 17,20;20,21-bismethylenedioxy derivative was prepared from 8.0 g. of 2-hydroxymethylene-4-pregnene-11β,17α,21-triol-3,20-dione 17,20;20,21-bismethylenedioxy derivative and 4 ml. of hydrazine hydrate in 300 ml. of ethanol. There was thus obtained 6.6 g. of 11β,17α,21-trihydroxy-20-oxo-4-pregneno[3.2-c]pyrazole 17,20;20,21-bismethylenedioxy derivative, m.p. 210°–240° C. (uncorr.). Chromatography on silica gel and recrystallization from an ethanol-ethyl acetate mixture gave a sample having the m.p. 301°–304° C. (uncorr.).

EXAMPLE 65 a. 2-Hydroxymethylene-9-fluoro-4-pregnene-11β,17α,21-triol-3,20-dione 17,20;20,21-bismethylenedioxy derivative was prepared from 6.0 g. of 9α-fluoro-4-pregnene-11β,17α,21-triol-3,20-dione 17,20;20,21-bismethylenedioxy derivative, 15 ml. of ethyl formate and 1.3 g. of sodium hydride according to the manipulative procedure described above in Example 2. There was thus obtained 4.7 g. of 2-hydroxymethylene-9-fluoro-4-pregnene-11β,17α,21-triol-3,20-dione 17,20;20,21-bismethylenedioxy derivative, m.p. 150°–170° C., used directly in the following reaction.

b. 9-Fluoro-11β,17α,21-trihydroxy-20-oxo-4-pregneno[3.2-c]-pyrazole 17,20;20,21-bismethylenedioxy derivative was prepared from 1.00 g. of 2-hydroxymethylene-9-fluoro-4-pregnene-11β,17α,21-triol-3,20-dione 17,20;20,21-bismethylenedioxy derivative and 0.5 ml. of hydrazine hydrate in 40 ml. of ethanol. There was thus obtained 0.9 g. of 9-fluoro-11β,17α,21-trihydroxy-20-oxo-4-pregneno[3.2-c]pyrazole 17,20;20,21-bismethylenedioxy derivative, m.p. 220°–260° C. (uncorr.).

EXAMPLE 66

17α,20-Dihydroxy-4-pregneno[3.2-c]pyrazole [VII; R and R' are H, R'' is $CH(OH)CH_3$, X is $H_2$, Z is OH, Y and Y' are $CH_3$] can be prepared by introduction of a hydroxymethylene group into the 2-position of 4-pregnene-17α,20-diol-3-one according to the manipulative procedure described above in Example 1, part (a), followed by reacting the resulting 2-hydroxymethylene-4-pregnene-17α,20-diol-3-one with hydrazine according to the manipulative procedure described above in Example 1, part (b).

EXAMPLE 67

9α-Fluoro-17β-hydroxy-11-oxo-17α-methyl-4-androsteno[3.2-c]-pyrazole can be prepared by introduction of a hydroxymethylene group into the 2-position of 9α-fluoro-17α-methyl-4-androsten-17β-ol-3,11-dione according to the manipulative procedure described above in Example 1, part (a) followed by reacting the resulting 2-hydroxymethylene-9α-fluoro-17α-methyl-4-androsten-17β-ol-3,11-dione with hydrazine according to the manipulative procedure described above in Example 1, part (b).

EXAMPLE 68

9β,11β-Epoxy-17α-methyl-17β-hydroxy-4-androsteno[3.2-c]pyrazole can be prepared by introduction of a hydroxymethylene group into the 2-position of 9β,11β-epoxy-17α-methyl-4-androsten-17β-ol-3-one according to the manipulative procedure described above in Example 1, part (a) followed by reacting the resulting 2-hydroxymethylene-9β,11β-epoxy-17α-methyl-4-androsten-17β-ol-3-one with hydrazine according to the manipulative procedure described above in Example 1, part (b).

EXAMPLE 69 a. 2-Hydroxymethylene-4-androstene-11β,17β-diol-3-one was prepared from 13.11 g. of 4-androstene-11β,17β-diol-3-one, 20 ml. of ethyl formate and 7.20 g. of sodium hydride according to the manipulative procedure described above in Example 2. The product was recrystallized from ethyl acetate to give 2-hydroxymethylene-4-androstene-11β,17β-diol-3-one, m.p. 168°-190° C. (uncorr.); ultraviolet maxima at 251 and 307 mμ (E = 11,700 and 5,200, respectively).

b. 11β,17β-Dihydroxy-4-androsteno[3.2-c]pyrazole [VII; R, R' and R'' are H, X is (H)(OH), Z is OH, Y and Y' are $CH_3$] was prepared from 3.48 g. of 2-hydroxymethylene-4-androstene-11β,17β-diol-3-one and 0.60 g. of hydrazine hydrate in 50 ml. of ethanol. The product was recrystallized from ethanol to give 11β,17β-dihydroxy-4-androsteno[3.2-c]pyrazole containing 1 mole of ethanol of crystallization, m.p. 233.2°-246.0° C. (corr.); ultraviolet maximum at 262 mμ (E = 10,700).

Anal. Calcd. for $C_{20}H_{28}N_2O_2 \cdot C_2H_5OH$: C, 70.55; H, 9.15; N(basic), 3.74.

Found: C, 70.80; H, 9.37; N(basic), 4.00.

EXAMPLE 70 a. 2-Hydroxymethylene-17α-(1-propynyl)androstan-17β-ol-3-one was prepared from 5.0 g. of 17α-(1-propynyl)androstan-17β-ol-3-one, 6.5 ml. of ethyl formate and sodium methoxide (from 2.0 g. of sodium and 30 ml. of methanol) according to the manipulative procedure described above in Example 1, part (a). There was thus obtained 5.5 g. of 2-hydroxymethylene-17α-(1-propynyl)-androstan-17β-ol-3-one in the form of a resin, used directly in the following reaction.

b. 17β-Hydroxy-17α-(1-propynyl)androstano[3.2-c]pyrazole [VI; R and R' are H, R'' is C = $CCH_3$, X is $H_2$, Z is OH, Y and Y' are $CH_3$] was prepared from 2.0 g. of 2-hydroxymethylene-17α-propynylandrostan-17β-ol-3-one and 0.4 ml. of hydrazine hydrate in 50 ml. of methanol. The product was recrystallized from ethyl acetate to give 17β-hydroxy-17α-(1-propynyl)androstano-[3.2-c]pyrazole, m.p. indefinite starting at 143.2° C. (corr.), $[\alpha]_D^{25} = -29.6°$ (1 percent in pyridine), −29.3° (1 percent in dimethylformamide); ultraviolet maximum at 224 mμ (E = 5,400).

Anal. Calcd. for $C_{23}H_{32}N_2O$: C, 78.36; H, 9.15; O, 4.54.
Found: C, 78.04; H, 9.10; O, 4.64.

EXAMPLE 71

2-Hydroxymethylene-4,4-dimethylandrostan-17β-ol-3-one was prepared from 4,4-dimethylandrostan-17β-ol-3-one and ethyl formate in the presence of sodium methoxide, and was obtained in the form of cream-colored crystals, m.p. 154.5°-159° C., $[\alpha]_D^{25} = +37.5°$ (1 percent in chloroform) when recrystallized from isopropyl alcohol. It was interacted with hydrazine to give 17β-hydroxy-4,4-dimethylandrostano[3.2-c]pyrazole, m.p. 229.5°-235.5° C., $[\alpha]_D^{25} = +31.6°$, when recrystallized from methanol.

EXAMPLE 72

2-Hydroxymethylene-4,4-tetramethylene-17α-methyl-5-androsten-17β-ol-3-one was prepared from 4,4-tetramethylene-17α-methyl-5-androsten-17β-ol-3-one and ethyl formate in the presence of sodium methoxide, and was obtained in the form of short pink prismatic crystals, m.p. 186.5°-190° C., $[\alpha]_D^{25} = -89.0°$ (1 percent in chloroform) when recrystallized from ethyl acetate-acetone. It was interacted with hydrazine to give 17β-hydroxy-17α-methyl-4,4-tetramethylene-5-androsteno[3.2-c]pyrazole, pale yellow crystals, m.p. 266°-270° C., $[\alpha]_D^{25} = -67.9°$ (1 percent in chloroform) when recrystallized from methanol-ethyl methyl ketone.

The intermediate 4,4-tetramethylene-17α-methyl-5-androsten-17β-ol-3-one, m.p. 177°-179° C. (from methanol), $[\alpha]_D^{25} = -54.1°$ (1 percent in chloroform) was prepared by interacting methyltestosterone with 1,4-dibromobutane in the presence of potassium t-butoxide.

EXAMPLE 73

2-Hydroxymethylene-4,4-pentamethylene-17α-methyl-5-androsten-17β-ol-3-one was prepared from 4,4-pentamethylene-17α-methyl-5-androsten-17β-ol-3-one and ethyl formate in the presence of sodium methoxide, and was obtained in the form of colorless prisms, m.p. 186°-191° C., $[\alpha]_D^{25} = -71.0°$ (1 percent in chloroform) when recrystallized from methyl ethyl ketone-methylene dichloride. It was interacted with hydrazine to give 17β-hydroxy-17α-methyl-4,4-pentamethylene-5-androsteno[3.2-c]-pyrazole, yellow granules, m.p. 279°-280° C., $[\alpha]_D^{25} = -62.8°$ (1 percent in chloroform) when recrystallized from tetrahydrofuran-ethyl acetate.

The intermediate 4,4-pentamethylene-17α-methyl-5-androsten-17β-ol-3-one, m.p. 187°-197° C., Was prepared by interacting methyltestosterone with 1,5-dibromopentane in the presence of potassium t-butoxide.

EXAMPLE 74

2-Hydroxymethylene-4,4-diethyl-17α-methyl-5-androsten-17β-ol-3-one was prepared from 4,4-diethyl-17α-methyl-5-androsten-17β-ol-3-one and ethyl formate in the presence of sodium methoxide, and was obtained in the form of stout needles, m.p. 177°-178° C., $[\alpha]_D^{25} = -40.3°$ (1 percent in chloroform) when recrystallized from ethyl acetate. It was interacted with hydrazine to give 17β-hydroxy-17α-methyl-4,4-diethyl-5-androsteno[3.2-c] pyrazole, colorless needles, m.p. 229.5°-233.5° C., $[\alpha]_D^{25} = -50.9°$ (1 percent in chloroform) when recrystallized from ethanol.

The intermediate 4,4-diethyl-17α-methyl-5-androsten-17β-ol-3-one, m.p. 189°-192° C. was prepared by interacting methyltestosterone with ethyl bromide in the presence of potassium t-butoxide.

EXAMPLE 75

2-Hydroxymethylene-4,17α-dimethyl-4-androsten-17β-ol-3-one was prepared from 4,17α-dimethyl-4-androsten-17β-ol-3-one and ethyl formate in the presence of sodium methoxide, and was obtained in the form of light yellow crystals, m.p. 197°-204° C., $[\alpha]_D^{25} = -0.4°$ (1 percent in chloroform) when recrystallized from ether. It was interacted with hydrazine to give 17β-hydroxy-4,17α-dimethyl-4-androsteno[3.2-c]pyrazole, m.p. 242-243°C., $[\alpha]_D^{25} = +80.5°$ (1 percent in chloroform) when recrystallized from methanol.

EXAMPLE 76

2-Hydroxymethylene-4α,17α-dimethylandrostan-17β-ol-3-one was prepared from 4α,17α-dimethylandrostan-17β-ol-3-one and ethyl formate in the presence of sodium methoxide, and was obtained in the form of colorless crystals, m.p. 176°-179° C., $[\alpha]_D^{25} = +3.7°$ (1 percent in chloroform) when recrystallized from acetone. It was interacted with hydrazine to give 17β-hydroxy-4α,17α-dimethylandrostano[3.2-c]pyrazole, m.p. 278-280°C., $[\alpha]_D^{25} = +13.5°$ (1 percent in chloroform) when recrystallized from methanol.

EXAMPLE 77 a. 2-Hydroxymethylene-17α-methyl-19-norandrostan-17β-ol-3-one was prepared from 4.35 g. of 17α-methyl-19-norandrostan-17β-ol-3-one, 10 ml. of ethyl formate and 2.40 g. of sodium hydride according to the manipulative procedure described above in Example 2. There was thus obtained 4.35 g. of 2-hydroxymethylene-17α-methyl-19- norandrostan-17β-ol-3-one, m.p. 190°–200° C. (uncorr.). A sample obtained in the pure state had the m.p. 206.2°–210° C. (corr.), [α]$_D^{25}$=+96.1±0.1° (1 percent in chloroform); ultraviolet maximum at 283 mμ (E = 7,800).
Anal. Calcd. for C$_{20}$H$_{30}$O$_3$: C, 75.44; H, 9.50.
Found: C, 75.61; H, 9.44.

b. 17β-Hydroxy-17α-methyl-19-norandrostano[3.2-c]pyrazole [VI; R and R' are H, R'' is CH$_3$, X is H$_2$, Z is OH, Y is H, Y' is CH$_3$] was prepared from 3.18 g. of 2-hydroxymethylene-17α-methyl-19-norandrostan-17β-ol-3-one and 0.55 g. of hydrazine hydrate in 50 ml. of ethanol. There was thus obtained 2.80 g. of 17β-hydroxy-17α-methyl-19-norandrostano[3.2-c]pyrazole, m.p. 126°–132° C. (uncorr.)(gas evolution). A sample was obtained in the pure state in the form of prisms, m.p. 140.4°–152.4° C. (corr.), [α]$_D^{25}$ = +90.0 ± 0.1° (1 percent in chloroform); ultraviolet maximum at 224 mμ (E = 4,800).
Anal. Calcd. for C$_{20}$H$_{30}$N$_2$O: C, 76.38; H, 9.62; N, 8.91.
Found: C, 76.07; H, 9.62; N, 8.98.

I claim:
1. A compound selected from the group consisting of (A) compounds having the formula

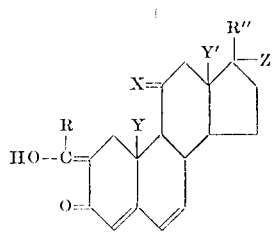

wherein R represents a member of the group consisting of hydrogen and lower-alkyl radicals; R'' represents a member of the group consisting the acetyl radical, ketalized acetyl radicals, the hydroxyacetyl radical, ketalized hydroxyacetyl radicals, the 1,2-dihydroxyethyl radical and the 1-hydroxyethyl radical; X represents a member of the group consisting of H$_2$, (H)(OH) and O; Y and Y' represent a member of the group consisting of hydrogen and the methyl radical; and Z represents a member of the group consisting of hydrogen and the a-hydroxy radical, and (B) carboxylic acid esters thereof derived from carboxylic acids having from one to about ten carbon atoms and having a molecular weight less than about 200.

2. A compound according to claim 1, 2-hydroxy-methylene-4,6-pregnadiene-17α,21-diol-3,11,20-trione 20-monoethylene glycol ketal.

3. A compound of the formula

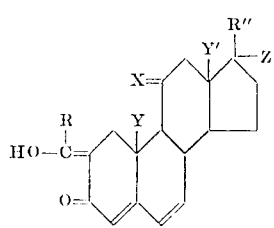

wherein R is hydrogen or lower-alkyl, R'' is α-lower-alkyl, Y and Y' are hydrogen or methyl, and Z is β-hydroxy.

4. A compound according to claim 3 selected from the group consisting of:
 a. 2-hydroxymethylene-17α-methyl-4,6-androstadien-17β-ol-3-one and
 b. 2-hydroxymethylene-17α-ethyl-4,6-androstadien-17β-ol-3-one.

5. A compound of the formula

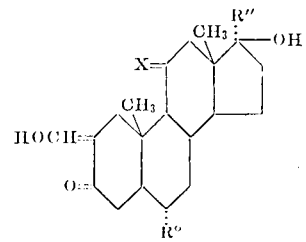

wherein R'' is lower-alkenyl or lower-alkynyl, R° is hydrogen or lower-alkyl, and X is H$_2$, or a compound of the above formula having a double bond in the 4,5-position.

6. A compound according to claim 5 selected from the group consisting of:
 a. 2-hydroxymethylene-17α-vinyl-4-androsten-17β-ol-3-one
 b. 17α-ethynyl-2-hydroxymethylene-4-androsten-17β-ol-3-one
 c. 2-hydroxymethylene-17α-propargylandrostan-17β-ol-3-one
 d. 2-hydroxymethylene-17α-vinylandrostan-17β-ol-3-one
 e. 2-hydroxymethylene-17α-ethynylandrostan-17β-ol-3-one
 f. 2-hydroxymethylene-17α-allyl-4-androsten-17β-ol-3-one
 g. 2-hydroxymethylene-6α-methyl-17α-propynyl-4-androsten-17β-ol-3-one
 h. 2-hydroxymethylene-17α-propargyl-4-androsten-17β-ol-3-one
 i. 2-hydroxymethylene-17α-propynylandrostan-17β-ol-3-one.

7. 2-Hydroxymethylene-17α-ethynyl-4-androsten-17β-ol-3,11-dione.

8. A compound of the formula

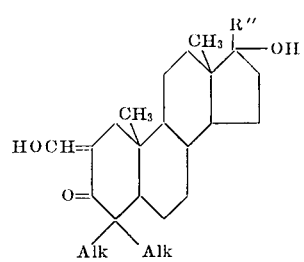

wherein R'' is hydrogen or lower-alkyl, the Alk groups are lower-alkyl groups which can be combined to form a spirocycloalkane group of 5–6 ring members; or a compound of the above formula having a double bond in the 5,6-position.

9. A compound according to claim 8 selected from the group consisting of:
 a. 2-hydroxymethylene-4,4,17α-trimethyl-5-androsten-17β-ol-3-one
 b. 2-hydroxymethylene-4,4-dimethyl-5-androsten-17β-ol-3-one
 c. 2-hydroxymethylene-4,4,17α-trimethylandrostan-17β-ol-3-one
 d. 2-hydroxymethylene-4,4-dimethylandrostan-17β-ol-3-one
 e. 2-hydroxymethylene-4,4-tetramethylene-17α-methyl-5-androsten-17β-ol-3-one
 f. 2-hydroxymethylene-4,4-pentamethylene-17α-methyl-5-androsten-17β-ol-3-one
 g. 2-hydroxymethylene-4,4-diethyl-17α-methyl-5-androsten-17β-ol-3-one.

10. A compound of the formula

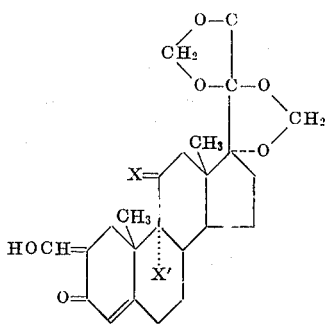

wherein X is (H) (OH) or O and X' is hydrogen or fluorine.

11. A compound according to claim 10 selected from the group consisting of:
   a. 2-hydroxymethylene-4-pregnene-17α,21-diol-3,11,20-trione 17,20;20,21-bismethylenedioxy derivative
   b. 2-hydroxymethylene-4-pregnene-11β,17α,21-triol-3,20-dione 17,20;20,21-bismethylenedioxy derivative
   c. 2-hydroxymethylene-9-fluoro-4-pregnene-11β,17α,21-triol-3,20-dione 17,20;20,21-bismethylenedioxy derivative.

12. A compound of the formula

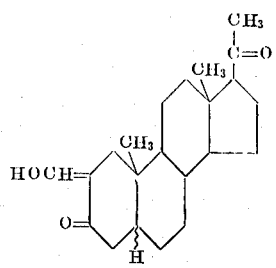

or a 20-ethylene glycol ketal thereof.

13. A compound according to claim 12 selected from the group consisting of:
   a. 2-hydroxymethyleneallopregnane-3,20-dione 20-ethylene glycol ketal
   b. 2-hydroxymethyleneallopregnane-3,20-dione
   c. 2-hydroxymethylenepregnane-3,20-dione.

14. 2-Hydroxymethylene-4-pregnen-20β-ol-3-one.

15. 2-Hydroxymethylene-4-pregnene-17α,21-diol-3,11,20-trione.

16. A compound selected from the group consisting of:
   a. 2-acetyl-17β-acetoxyandrostan-3-one
   b. 2-(n-butyryl)androstan-17β-ol-3-one
   c. 2-formyl-17α-methyl-1,4-androstadien-17β-ol-3-one
   d. 2-hydroxymethyleneandrostane-6β,17β-diol-3-one
   e. 2-hydroxymethylene-4-androstene-6β,17β-diol-3-one
   f. 2-hydroxymethylene-17α-methyl-4-androstene-6β,17β-diol-3-one
   g. 2-hydroxymethylene-4-androstene-14α,17β-diol-3-one
   h. 2-hydroxymethylene-16β-methyl-4-androsten-17β-ol-3-one
   i. 2-hydroxymethylene-19-nor-4-androstene-6β,17β-diol-3-one
   j. 2-hydroxymethylene-4-bromo-17α-methyl-4-androsten-17β-ol-3-one
   k. 2-formyl-2α,17α-dimethyl-4-androsten-17β-ol-3-one
   l. 2-hydroxymethylene-17α-ethylandrostan-17β-ol-3,7-dione 7-monoethylene glycol ketal
   m. 2-hydroxymethylene-9α-fluoro-17α-methyl-4-androsten-17β-ol-3,11-dione
   n. 2-hydroxymethylene-9β,11β-epoxy-17α-methyl-4-androsten-17β-ol-3-one 17. A compound selected from the group consisting of:
   a. 2-hydroxymethylene-4,4-dimethyl-5-pregnene-3,20-dione 20-ethylene glycol ketal
   b. 2-hydroxymethylene-4-pregnene-20,21-diol-3-one
   c. 2-hydroxymethylene-4-pregnene-16α,17α,21-triol-3,20-dione-9β,11β-oxide 20-monoethylene glycol ketal
   d. 2-formyl-1,4-pregnadiene-17α,21-diol-3,11,20-trione 20-monoethylene glycol ketal
   e. 2-hydroxymethylene-4-pregnene-20,21-diol-3-one 20,21-acetonide
   f. 2-hydroxymethylene-6-methyl-4-pregnene-17α,21-diol-3,11,20-trione 20-monoethylene glycol ketal
   g. 2-hydroxymethylene-9-fluoro-6-methyl-4-pregnene-17α,21-diol-3,11,20-trione 20-monoethylene glycol ketal
   h. 2-formyl-2-methyl-4-pregnene-17α,21-diol-3,11,20-trione 20-monoethylene glycol ketal
   i. 2-formyl-2-methyl-4-pregnene-11β,16α,17α,21-tetrol-3,20-dione 20-monoethylene glycol ketal
   j. 2-hydroxymethylene-4-pregnene-16α,17α,21-triol 3,11,20-trione 20-monoethylene glycol ketal
   k. 2-hydroxymethylene-4,17(20)-pregnadiene-11β,21-diol-3-one
   l. 2-hydroxymethyleneallopregnane-6β,17α,21-triol-3,20-dione 20-monoethylene glycol ketal
   m. 2-hydroxymethylene-4-pregnene-12α,17α,21-triol-3,20-dione 20-monoethylene glycol ketal
   n. 2-hydroxymethyleneallopregnane-17α,21-diol-3,12,20-trione 20-monoethylene glycol ketal
   o. 2-hydroxymethylene-4,11-pregnadiene-3,20-dione 20-monoethylene glycol ketal
   p. 2-hydroxymethylene-17α-methyl-4-pregnene-3,20-dione 20-monoethylene glycol ketal
   q. 2-hydroxymethylene-4-pregnen-6β-ol-3,20-dione 20-monoethylene glycol ketal
   r. 2-hydroxymethylene-4-pregnene-7β,11β-diol-3,20-dione 20-monoethylene glycol ketal
   s. 2-hydroxymethylene-12α-chloro-4-pregnene-17α,21-diol-3,11,20-trione 20-monoethylene glycol ketal
   t. 2-hydroxymethylene-18,19-bisnor-4-pregnene-3,20-dione 20-monoethylene glycol ketal
   u. 2-hydroxymethylene-4-bromo-4-pregnene-17α,21-diol-3,11,20-trione 20-monoethylene glycol ketal
   v. 2-hydroxymethylene-4-pregnene-7α,12α-diol-3,20-dione 20-monoethylene glycol ketal
   w. 2-hydroxymethyleneallopregnane-3,7,20-trione 7,20-bis(ethylene glycol ketal)
   x. 2-hydroxymethyleneallopregnane-3,7-dione 7-monoethylene glycol ketal
   y. 2-hydroxymethylene-4-pregnene-17α,20-diol-3-one.

18. 5α,6α-Epxoy-17α-(1-propynyl)androstane-3β,17β-diol 3-acetate.

* * * * *